(12) United States Patent
Islam et al.

(10) Patent No.: US 10,341,959 B2
(45) Date of Patent: Jul. 2, 2019

(54) UPLINK TRANSMIT POWER CONTROL AFTER BEAM CHANGE

(71) Applicant: QUALCOMM Incorporated, San Diego, CA (US)

(72) Inventors: Muhammad Nazmul Islam, Edison, NJ (US); Tao Luo, San Diego, CA (US); Juergen Cezanne, Ocean Township, NJ (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 15/355,647

(22) Filed: Nov. 18, 2016

(65) Prior Publication Data

US 2017/0318541 A1    Nov. 2, 2017

Related U.S. Application Data

(60) Provisional application No. 62/329,189, filed on Apr. 28, 2016.

(51) Int. Cl.
*H04W 52/14* (2009.01)
*H04W 52/42* (2009.01)
(Continued)

(52) U.S. Cl.
CPC ........ *H04W 52/146* (2013.01); *H04B 7/0617* (2013.01); *H04B 7/0695* (2013.01);
(Continued)

(58) Field of Classification Search
CPC ............... H04W 52/146; H04W 52/42; H04W 72/0413; H04W 72/042; H04W 72/046; H04W 74/0833
See application file for complete search history.

(56) References Cited

U.S. PATENT DOCUMENTS 9,014,287 B2    4/2015    Luo et al.
1,000,407 A1    6/2018    Sung et al.
(Continued)

FOREIGN PATENT DOCUMENTS

WO    WO-2016086144 A1    6/2016

OTHER PUBLICATIONS

ISA/EP, International Search Report and Written Opinion of the International Searching Authority, Int'l Application No. PCT/US2017/024261, dated May 23, 2017, European Patent Office, Rijswijk, NL, 15 pgs.

*Primary Examiner* — Ronald B Abelson
(74) *Attorney, Agent, or Firm* — Holland & Hart LLP; Clint R. Morin

(57) ABSTRACT

Uplink transmission power levels may be adjusted in response to changes in a directional beam used for wireless communications. A beam change may be identified, wherein the beam change includes a transition from a first transmission configuration based on a first beam direction of a cell to a second transmission configuration based on a second beam direction of the cell. A downlink (DL) message associated with the beam change may be received, wherein the DL message comprises a transmission power indication. An uplink (UL) message may be transmitted at a power level based at least in part on the transmission power indication.

26 Claims, 18 Drawing Sheets

(51) Int. Cl.
*H04W 72/04* (2009.01)
*H04W 74/08* (2009.01)
*H04B 7/06* (2006.01)
*H04W 52/08* (2009.01)

(52) U.S. Cl.
CPC ......... *H04W 52/42* (2013.01); *H04W 72/042* (2013.01); *H04W 72/046* (2013.01); *H04W 72/0413* (2013.01); *H04W 74/0833* (2013.01); *H04W 52/08* (2013.01)

(56) References Cited

U.S. PATENT DOCUMENTS

| | | |
|---|---|---|
| 1,009,809 A1 | 10/2018 | Seol et al. |
| 2005/0197149 A1 | 9/2005 | Iacono et al. |
| 2006/0270434 A1 | 11/2006 | Iacono |
| 2011/0019603 A1 | 1/2011 | Jeon et al. |
| 2013/0142174 A1* | 6/2013 | Larsson ............... H04B 7/0434 370/335 |
| 2013/0229307 A1 | 9/2013 | Chang et al. |
| 2014/0079155 A1 | 3/2014 | Wang et al. |
| 2014/0112220 A1* | 4/2014 | Kwak .................. H04B 7/0695 370/294 |
| 2014/0185481 A1 | 7/2014 | Seol et al. |
| 2016/0013858 A1 | 1/2016 | Jalali et al. |

* cited by examiner

UPLINK TRANSMIT POWER CONTROL AFTER BEAM CHANGE

CROSS REFERENCES

The present application for patent claims priority to U.S. Provisional Patent Application No. 62/329,189 by Islam, et al., entitled "Uplink Transmit Power control After Beam Change," filed Apr. 28, 2016, assigned to the assignee hereof.

BACKGROUND

The following relates generally to wireless communication, and more specifically to uplink transmit power control after beam change.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some wireless communication systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine energy and overcome the path losses at these frequencies. In mmW systems using directional transmission, channel conditions and UE position may change rapidly, thereby prompting frequent changes in the beam direction. The changing conditions may also result in transmission power settings based on parameters that are no longer valid. This may cause transmitted packets to be lost, which in turn may cause communications disruptions and reduced throughput.

SUMMARY

Generally, the described techniques relate to adjusting uplink transmission power levels in response to changes in a directional beam used for wireless communications. A base station may decide to perform a beam change either in response to a request from a user equipment (UE) or based on other downlink scheduling factors. After a beam change, a base station may send a downlink message to the UE with uplink transmission power commands to use for initial or subsequent uplink transmissions. The downlink message may be formatted with additional bits reserved for the power commands to accommodate the frequent and drastic changes in uplink power as a result of the frequent beam changes.

A method of wireless communication is described. The method may include identifying a beam change, the beam change comprising a transition from a first transmission configuration based on a first beam direction of a cell to a second transmission configuration based on a second beam direction of the cell, receiving a downlink (DL) message associated with the beam change, wherein the DL message comprises a transmission power indication, and transmitting an uplink (UL) message at a power level based at least in part on the transmission power indication.

An apparatus for wireless communication is described. The apparatus may include means for identifying a beam change, the beam change comprising a transition from a first transmission configuration based on a first beam direction of a cell to a second transmission configuration based on a second beam direction of the cell, means for receiving a DL message associated with the beam change, wherein the DL message comprises a transmission power indication, and means for transmitting an UL message at a power level based at least in part on the transmission power indication.

A further apparatus for wireless communication is described. The apparatus may include a processor, memory in electronic communication with the processor, and instructions stored in the memory. The instructions may be operable to cause the processor to identify a beam change, the beam change comprising a transition from a first transmission configuration based on a first beam direction of a cell to a second transmission configuration based on a second beam direction of the cell, receive a DL message associated with the beam change, wherein the DL message comprises a transmission power indication, and transmit an UL message at a power level based at least in part on the transmission power indication.

A non-transitory computer readable medium for wireless communication is described. The non-transitory computer-readable medium may include instructions operable to cause a processor to identify a beam change, the beam change comprising a transition from a first transmission configuration based on a first beam direction of a cell to a second transmission configuration based on a second beam direction of the cell, receive a DL message associated with the beam change, wherein the DL message comprises a transmission power indication, and transmit an UL message at a power level based at least in part on the transmission power indication.

Some examples of the method, apparatus, or non-transitory computer-readable medium described above may further include processes, features, means, or instructions for identifying a beam change condition. Some examples of the method, apparatus, or non-transitory computer-readable medium described above may further include processes, features, means, or instructions for transmitting a beam change indication message based at least in part on the beam change condition, wherein the DL message is associated with the beam change indication message.

In some examples of the method, apparatus, or non-transitory computer-readable medium described above, transmitting the beam change indication message comprises: transmitting a beam change request message or a channel quality indication (CQI) message.

In some examples of the method, apparatus, or non-transitory computer-readable medium described above, transmitting the beam change indication message comprises: transmitting the beam change indication message using a random access channel (RACH) transmission configuration.

In some examples of the method, apparatus, or non-transitory computer-readable medium described above, transmitting the beam change indication message comprises: transmitting the beam change indication message using subcarrier regions of a RACH subframe other than subcarrier regions reserved for RACH transmissions. In some examples of the method, apparatus, or non-transitory computer-readable medium described above, transmitting the beam change indication message comprises: transmitting the beam change indication message using a physical uplink control channel (PUCCH).

In some examples of the method, apparatus, or non-transitory computer-readable medium described above, transmitting the beam change indication message comprises: transmitting the beam change indication message via one of a RACH transmission configuration, a subcarrier region of a RACH subframe other than a subcarrier region reserved for RACH transmissions, or a PUCCH based at least in part on a channel condition, a timing alignment, or both.

In some examples of the method, apparatus, or non-transitory computer-readable medium described above, receiving the DL message comprises: receiving a beam change request response. In some examples of the method, apparatus, or non-transitory computer-readable medium described above, receiving the DL message comprises: receiving the DL message using a physical downlink shared channel (PDSCH) or a physical downlink control channel (PDCCH).

In some examples of the method, apparatus, or non-transitory computer-readable medium described above, the DL message comprises a number of bits reserved for an initial transmission power setting. In some examples of the method, apparatus, or non-transitory computer-readable medium described above, the bits reserved for the initial transmission power setting are associated with a downlink control information (DCI) format, and wherein the number of bits is based at least in part on the beam change.

In some examples of the method, apparatus, or non-transitory computer-readable medium described above, the number of bits is at least three. In some examples of the method, apparatus, or non-transitory computer-readable medium described above, the DL message comprises a number of bits reserved for a transmission power adjustment indication.

In some examples of the method, apparatus, or non-transitory computer-readable medium described above, the bits reserved for the transmission power adjustment indication is associated with a DCI format, and wherein the number of bits is based at least in part on the beam change. In some examples of the method, apparatus, or non-transitory computer-readable medium described above, the number of bits is at least three.

Some examples of the method, apparatus, or non-transitory computer-readable medium described above may further include processes, features, means, or instructions for receiving a subsequent DL message comprising a subsequent transmission power indication. Some examples of the method, apparatus, or non-transitory computer-readable medium described above may further include processes, features, means, or instructions for determining whether the subsequent transmission power indication is associated with an initial transmission power setting or a transmission power adjustment indication. Some examples of the method, apparatus, or non-transitory computer-readable medium described above may further include processes, features, means, or instructions for adjusting a transmission power based at least in part on the determining.

In some examples of the method, apparatus, or non-transitory computer-readable medium described above, receiving the subsequent DL message comprises: receiving the subsequent DL message using a PDSCH or a PDCCH.

In some examples of the method, apparatus, or non-transitory computer-readable medium described above, the beam change may be based at least in part on at least one channel condition associated with the first beam direction.

A method of wireless communication is described. The method may include identifying a beam change, the beam change comprising a transition from a first transmission configuration based on a first beam direction of a cell to a second transmission configuration based on a second beam direction of the cell, transmitting a DL message associated with the beam change, wherein the DL message comprises a transmission power indication, and receiving an UL message at a power level based at least in part on the transmission power indication.

An apparatus for wireless communication is described. The apparatus may include means for identifying a beam change, the beam change comprising a transition from a first transmission configuration based on a first beam direction of a cell to a second transmission configuration based on a second beam direction of the cell, means for transmitting a DL message associated with the beam change, wherein the DL message comprises a transmission power indication, and means for receiving an UL message at a power level based at least in part on the transmission power indication.

A further apparatus for wireless communication is described. The apparatus may include a processor, memory in electronic communication with the processor, and instructions stored in the memory. The instructions may be operable to cause the processor to identify a beam change, the beam change comprising a transition from a first transmission configuration based on a first beam direction of a cell to a second transmission configuration based on a second beam direction of the cell, transmit a DL message associated with the beam change, wherein the DL message comprises a transmission power indication, and receive an UL message at a power level based at least in part on the transmission power indication.

A non-transitory computer readable medium for wireless communication is described. The non-transitory computer-readable medium may include instructions operable to cause a processor to identify a beam change, the beam change comprising a transition from a first transmission configuration based on a first beam direction of a cell to a second transmission configuration based on a second beam direction of the cell, transmit a DL message associated with the beam change, wherein the DL message comprises a transmission power indication, and receive an UL message at a power level based at least in part on the transmission power indication.

Some examples of the method, apparatus, or non-transitory computer-readable medium described above may further include processes, features, means, or instructions for receiving a beam change indication message, wherein the DL message is associated with the beam change indication message.

In some examples of the method, apparatus, or non-transitory computer-readable medium described above, receiving the beam change indication message comprises: receiving a beam change request message or a CQI message. In some examples of the method, apparatus, or non-transitory computer-readable medium described above, receiving the beam change indication message comprises: receiving the beam change indication message using a RACH transmission configuration.

In some examples of the method, apparatus, or non-transitory computer-readable medium described above, receiving the beam change indication message comprises:

receiving the beam change indication message using subcarrier regions of a RACH subframe other than subcarrier regions reserved for RACH transmissions.

In some examples of the method, apparatus, or non-transitory computer-readable medium described above, receiving the beam change indication message comprises: receiving the beam change indication message using a physical uplink control channel (PUCCH). In some examples of the method, apparatus, or non-transitory computer-readable medium described above, receiving the beam change indication message comprises: receiving the beam change indication message via one of a RACH transmission configuration, a subcarrier region of a RACH subframe other than a subcarrier region reserved for RACH transmissions, or a PUCCH based at least in part on a channel condition, a timing alignment, or both.

In some examples of the method, apparatus, or non-transitory computer-readable medium described above, transmitting the DL message comprises: transmitting a beam change request response. In some examples of the method, apparatus, or non-transitory computer-readable medium described above, transmitting the DL message comprises: transmitting the DL message using a physical downlink shared channel (PDSCH) or a physical downlink control channel (PDCCH).

Some examples of the method, apparatus, or non-transitory computer-readable medium described above may further include processes, features, means, or instructions for determining whether to transmit an initial transmission power setting or a transmission power adjustment indication in a subsequent DL message. Some examples of the method, apparatus, or non-transitory computer-readable medium described above may further include processes, features, means, or instructions for transmitting the subsequent DL message.

In some examples of the method, apparatus, or non-transitory computer-readable medium described above, transmitting the subsequent DL message comprises: transmitting the subsequent DL message using a PDSCH or a PDCCH.

In some examples of the method, apparatus, or non-transitory computer-readable medium described above, the beam change may be based at least in part on downlink scheduling factors. In some examples of the method, apparatus, or non-transitory computer-readable medium described above, the beam change may be based at least in part on at least one channel condition associated with the first beam direction.

In some examples of the method, apparatus, or non-transitory computer-readable medium described above, the beam change may be based at least in part on at least one channel condition associated with the first beam direction.

In some examples of the method, apparatus, or non-transitory computer-readable medium described above, identifying the beam change may comprise performing a beam scan to identify the second beam direction of the cell.

In some examples of the method, apparatus, or non-transitory computer-readable medium described above, the beam change may be based at least in part on accommodating communications associated with more than one user equipment (UE).

DETAILED DESCRIPTION

Figure 1:
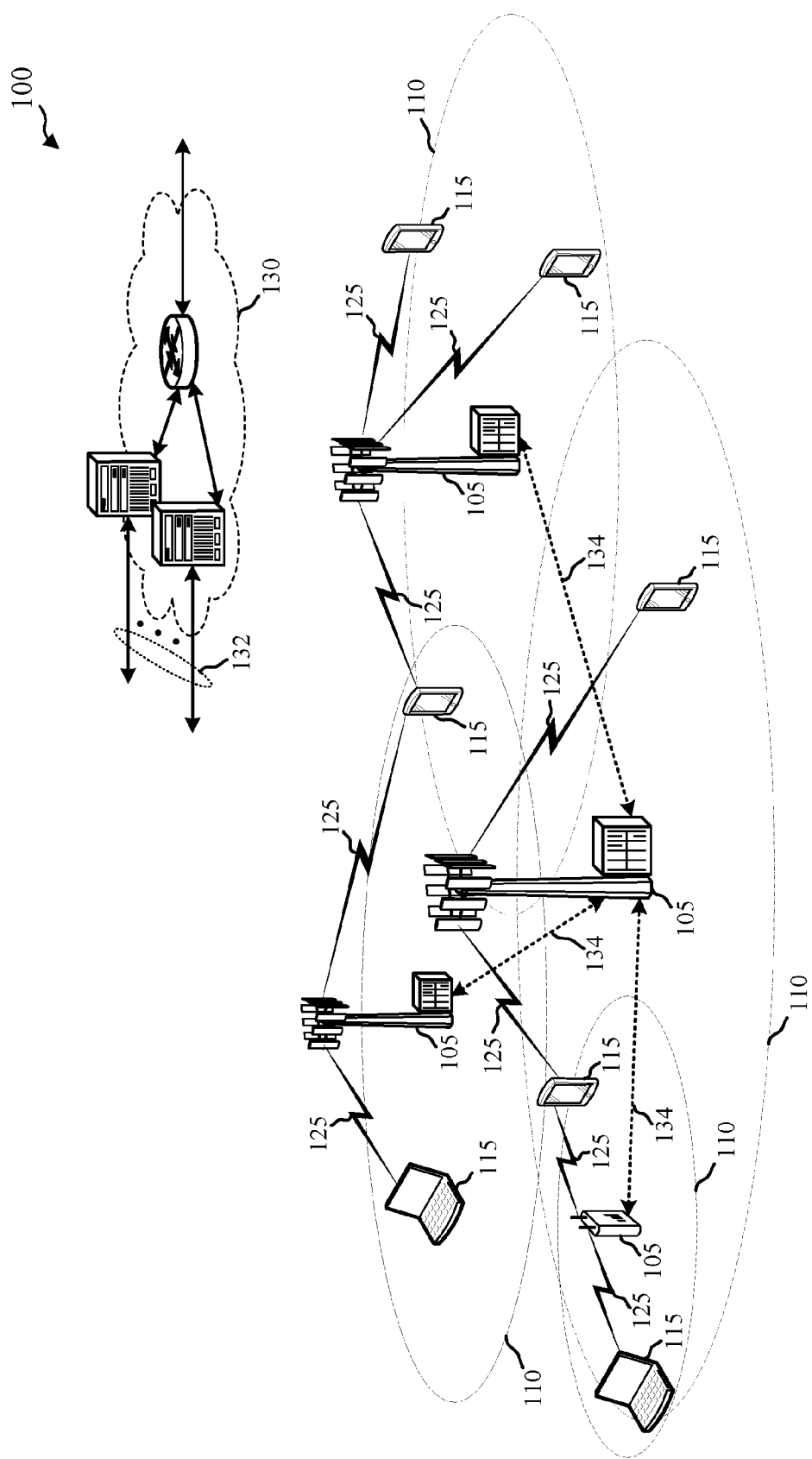
FIG. 1 illustrates an example of a wireless communications system that supports uplink transmit power control after beam change in accordance with aspects of the present disclosure.

Wireless communication systems operating in millimeter wave (mmW) frequency ranges may use beamforming techniques to coherently combine energy and overcome the increased path losses experienced at these frequencies. In such cases, the particular beam or beams with the highest signal-to-noise ratio (SNR) may frequently change, and a user equipment (UE) or base station may change the beam used for communications at any given time accordingly. Switching between beams may result in a change in the appropriate uplink (UL) transmission power for the UE. As such, each time the UE switches beams, the base station may provide the UE with UL transmission power commands that are appropriate for the new beam.

In some cases, a base station may select a different beam for UL or downlink (DL) communications with a UE based on, for example, channel conditions associated with the beam currently used by the UE. The beam change may be in response to a message from the UE, or may instead be in response to a scheduling decision made by the base station. In either case, upon selecting a new beam, the base station may inform the UE of the beam change, and may transmit some information to the UE regarding the UL transmission power (e.g., UL transmission power control (TCP) commands) to use for initial or subsequent UL communications.

In some cases, the UE may transmit a message requesting a beam change based on a change in channel conditions identified at the UE. In other cases, the UE may transmit a message indicating the channel quality, and the base station may decide to perform a beam change. The beam change request or channel quality message may be sent to the base station using one or more different transmission configurations or channels. In some cases, the UE may select which transmission configuration or channel to use based on channel conditions or a timing alignment.

In response to a beam change request or channel quality message, a base station may respond to the UE with one or more DL messages including UL transmission power indications. The UL transmission power indications may be associated with an initial UL transmission power setting or a transmission power adjustment. In some cases, the base station may use a modified format of the DL message to convey the UL transmission power commands to the UE. For example, the DL message may include additional bits.

In some cases, the DL message is a beam change request response sent from a base station. In these examples, the UE may observe a beam change and may transmit a beam change request to a base station. In these examples, the base station may respond to the beam change request sent from the UE with a random access channel (RACH) response. In some cases, the beam change request response is transmitted using a physical downlink shared channel (PDSCH). The beam change request response may include several bits that are reserved to indicate an initial UL transmit power for the UE.

Aspects of the disclosure are initially described in the context of a wireless communication system. Aspects are further described with reference to a synchronization subframe and an example process flow. Aspects of the disclosure are further illustrated by and described with reference to apparatus diagrams, system diagrams, and flowcharts that relate to title of the application.

FIG. 1 illustrates an example of a wireless communications system 100 in accordance with various aspects of the present disclosure. The wireless communications system 100 includes base stations 105, user equipment (UE)s 115, and a core network 130. In some examples, the wireless communications system 100 may be a Long Term Evolution (LTE) (or LTE-Advanced) network. Wireless communications system 100 may support requests by UEs 115 to change an active beam used for communications, and UL transmit power commands in response to beam changes that direct UEs 115 to set initial or subsequent UL transmit power.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may additionally be referred to as a mobile station, a subscriber station, a remote unit, a wireless device, an access terminal (AT), a handset, a user agent, a client, or like terminology. A UE 115 may additionally be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may additionally be referred to as eNodeBs (eNBs) 105.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for one or more multiple communication devices, which may be otherwise known as a UE.

In some cases, base station antennas may be located within one or more antenna arrays. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Wireless communications system 100 may operate in an ultra-high frequency (UHF) frequency or millimeter wave (mmW) region using frequency bands from 700 MHz to 2600 MHz (2.6 GHz), although in some cases wireless local area network (WLAN) networks may use frequencies as high as 4 GHz. This region may additionally be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum.

A UE 115 may coordinate transmit power with a serving base station to mitigate interference, improve the UL data rate, and prolong battery life. Uplink power control may include a combination of open-loop and closed-loop mechanisms. In open-loop power control the UE transmit power depends on estimates of the DL path-loss and channel configuration. In closed-loop power control that the network can directly control the UE transmit power using explicit power-control commands. Open-loop power control may be used for initial access, whereas both open and closed loop control may be used for UL control and data transmission. A UE 115 may determine power using an algorithm that takes into account a maximum transmission power limit, a target base station receive power, path loss, modulation and coding scheme (MCS), the number of resources used for transmission, and the format of the transmitted data (e.g., physical uplink control channel (PUCCH) format). Power adjustments may be made by a base station 105 using a transmit power command (TPC) messages, which may incrementally adjust the transmit power of a UE 115 as appropriate.

Figure 2:
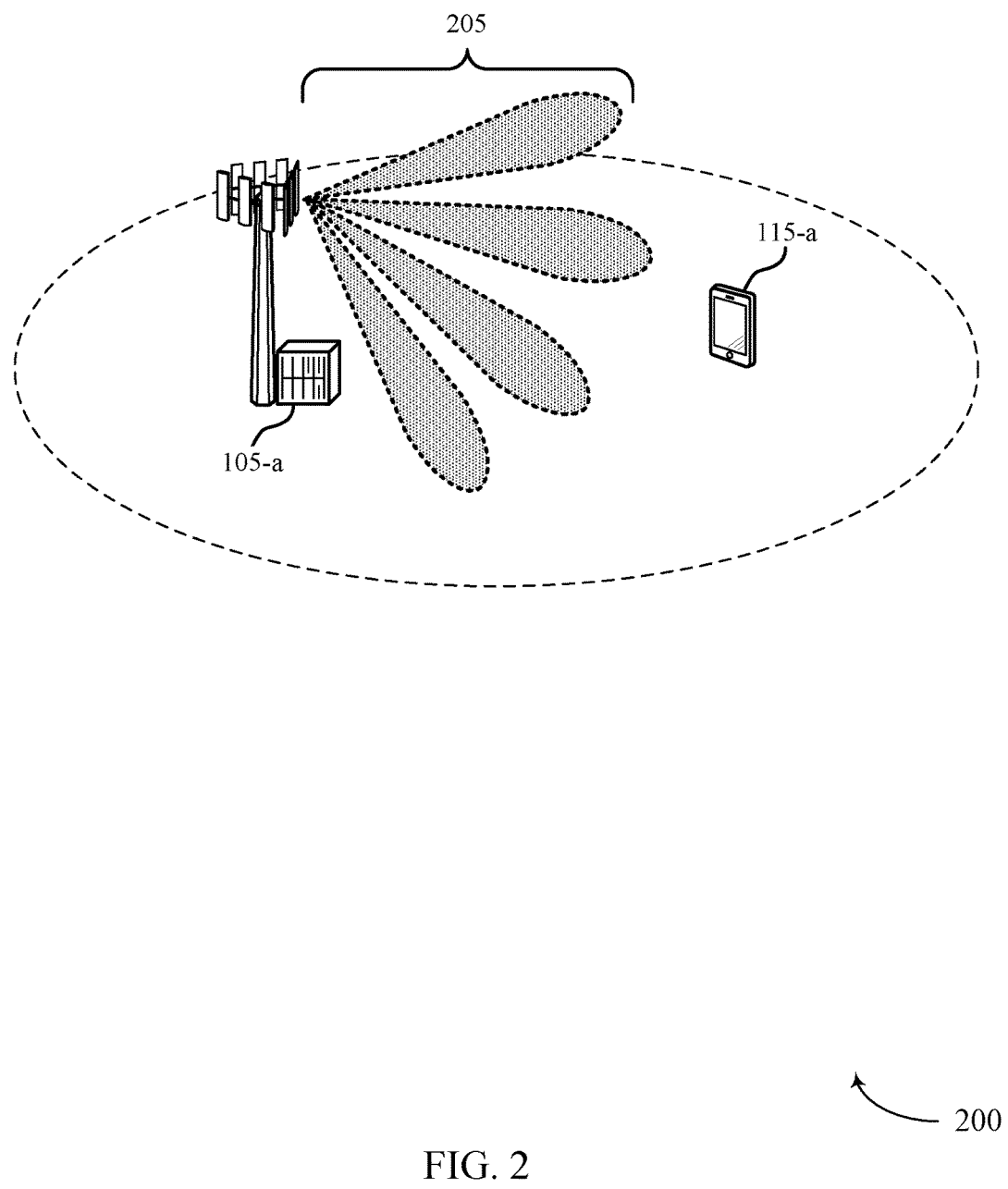
FIG. 2 illustrates an example of a wireless communications system that supports uplink transmit power control after beam change in accordance with aspects of the present disclosure.

FIG. 2. illustrates an example of a wireless communications system 200 for UL transmit power control after a beam change. Wireless communications system 200 may include a base station 105-a and a UE 115-a, which may be examples of the corresponding devices described with reference to FIG. 1. Base station 105-a and UE 115-a may communicate using one or more directional beams 205. Wireless communications system 200 may operate in mmW spectrum, where the channel conditions may change rapidly and frequently, thereby prompting frequent beam changes. Wireless communications system 200 may support requests to change an active beam of the direction beams 205, and the transmission of UL transmit power commands for UE 115-a to use for initial or subsequent UL communications.

In some cases, base station 105-a may decide to select a different beam 205 for UL or DL communications with UE 115-a based on, for example, channel conditions associated with the beam 205 currently used by UE 115-a. Changing a beam 205 may include transitioning from a first beam 205 associated with a first direction within a cell of the base station 105-a to a second beam 205 associated with a second direction within the same cell. The beam change may be in response to a message from the UE 115-a, or may instead be in response to a scheduling decision made by the base station 105-a. In either case, upon selecting a new beam 205, the base station 105-a may inform the UE 115-a of the beam change, and may transmit some information to the UE 115-a regarding the UL transmission power (e.g., UL TCP commands) to use for initial or subsequent UL communications.

The UE 115-a may transmit a message requesting a beam change using one or more different transmission configurations or channels. The beam change request may be in response to the UE 115-a identifying a change in conditions at the UE 115-a, such as a degraded channel conditions. The UE 115-a may request a beam change by transmitting a message using a random access channel (RACH) configuration, such as a RACH preamble. In other cases, the UE 115-a may request a beam change by transmitting a message using subcarrier regions of a RACH subframe that are not reserved for RACH transmissions. For example, the UE 115-a may send a message using a scheduling request (SR) region of a RACH subframe (a subcarrier region of a RACH subframe that is not reserved for RACH transmissions). In some cases, utilizing the SR region of a RACH subframe may allow for more UEs 115 to communicate with a base station 105 simultaneously due to the increased degrees of freedom within the SR region. In yet other examples, the UE 115-a may request a beam change by transmitting a message using the physical uplink control channel (PUCCH).

In some cases, the UE 115-a may select which transmission configuration, channel, or subframe region to use for the beam change request based on channel or alignment conditions at the UE 115-a. For example, the UE 115-a may first attempt to transmit the beam change request using a PUCCH message. If the channel conditions are below a certain threshold, communications using PUCCH may be unsuccessful. For example, the conditions may have changed to an extent such that the UE 115-a may not be able to communicate using PUCCH on the currently active beam 205. In that case, the UE 115-a may determine a timing alignment with respect to the base station 105-a. If the timing alignment is within a certain range (i.e., closely aligned), then the UE 115-a may attempt to send the beam change request through the SR region of a RACH sub-frame (or any other region of a RACH subframe not reserved for RACH transmissions). However, if the timing alignment is outside of a certain range (i.e., not closely aligned), then the UE 115-a may send the beam change request using RACH signaling. A UE 115-a may alternatively select RACH signaling when the UE 115-a initially accesses the network.

Instead of sending an explicit beam change request, UE 115-a may indicate to base station 105-a the current channel quality at the UE 115-a, and the base station 105-a may decide to select a new beam 205 based on the channel quality. For example, the UE 115-a may send a channel quality indication (CQI) message to the base station 105-a or some other similar message indicating the channel quality, signal-to-noise ratio (SNR), or other indication of interference. Upon receiving the message from the UE 115-a, the base station 105-a may decide to switch communications to a new beam 205, or to perform a beam scan in search of a new beam 205. The UE 115-a may send channel quality information using PUCCH signals if the channel quality is sufficient to sustain PUCCH communications. In other cases, the UE 115-a may send channel quality information using RACH signaling.

In some cases, the base station 105-a may decide to change a beam 205 for a UE 115-a without receiving a beam change request or interference indication from the UE 115-a. For example, a base station 105-a may identify two or more candidate beams 205 to use for communications with a particular UE 115-a and may select one of the candidates. Subsequently, the base station 105-a may recognize that an additional UE 115 has requested access to the base station, and may identify one or more candidate beams 205 for communications with the additional UE 115. In some cases, the base station 105-a may change the beam 205 being used by the first UE 115-a to accommodate communications with the additional UE 115. In such cases, the base station 105-a may inform the first UE 115-a of the beam change, and may transmit UL power information to the UE 115-a accordingly.

In response to a beam change request or interference indication message, a base station 105-a may respond to the UE 115-a with one or more DL messages, such as a DL control message. In such cases, the DL message may be a beam change request response. A DL control message may include UL transmission power parameters indicating an initial UL transmit power or a transmit power adjustment. A response to the beam change request may be based on the transmission configuration used by the UE 115-a to transmit the beam change request or interference indication. For example, if the UE 115-a sent a RACH preamble after a beam change, the base station 105-a may respond with a RACH response containing an initial UL power adjustment. Similarly, if the UE 115-a sent the beam change request through a region of a RACH subframe not reserved for RACH transmissions (e.g. an SR region), the base station 105-a may respond in the SR region with a beam change request response containing an initial transmit power adjustment.

In some cases, the DL message is a beam change request response sent from the base station 105-a. In these examples, the UE 115-a may observe a beam change and may transmit a beam change request to the base station 105-a. In these examples, the base station 105-a may respond to the beam change request sent from the UE 115-a with a random access channel (RACH) response. In some cases, the beam change request response is transmitted using a physical downlink shared channel (PDSCH). The beam change request response may include several bits that are reserved to indicate an initial UL transmit power for the UE 115-a.

In cases where the UE 115-a was able to communicate a beam change through PUCCH, the base station 105-a may respond via PUCCH with a beam change request response containing an initial transmit power adjustment. However, in some cases, the base station 105-a may transmit a beam change request response using a different transmission configuration or channel than the beam change request. In some cases, the DL message may be sent by the base station 105-*a* via a physical downlink shared channel (PDSCH) or a physical downlink control channel (PDCCH). Regardless of how the DL message is received, the UE 115-*a* may adjust a transmission power and transmit an UL message to the base station 105-*a* at a power level based on the transmission power indication in the DL message.

In some cases, the base station 105-*a* may modify the format of a DL control message that indicates an initial UL transmit power setting for the UE 115-*a*. For example, the downlink control information (DCI) format of a DL control message may contain three or more bits that are reserved for the initial transmit power setting. Additional bits in the DCI reserved for the initial transmit power information may be useful if the beam change results in a large change in uplink transmission power requirements. That is, the number of bits reserved for the initial transmit power setting may be based on the beam change. In some cases, each bit represents a different initial transmit power for the UE 115-*a*. The different initial power levels could range from −20 dB to 20 dB, for example. The base station 105-*a* may use such a modified DCI format each time there is a beam change to inform the UE 115-*a* of the initial UL transmit power.

After the initial UL communications between the base station 105-*a* and the UE 115-*a*, the base station 105-*a* may transmit subsequent DL messages including transmission power adjustment indications to the UE 115-*a* for subsequent UL communications. The subsequent DL messages may include a number of bits reserved for the transmission power adjustment indications, and the bits may be associated with a particular DCI format. For example, the base station 105-*a* may select a DCI format that includes additional bits (e.g., more than two bits) reserved for the transmission power adjustment information. The transmission power adjustment messages may be transmitted to the UE 115-*a* in an UL grant from the base station 105-*a*. The transmission power adjustment values may range from −10 dB to 10 dB, for example. A DCI format with a greater number of bits (e.g., a larger transmit power adjustment field) may facilitate the UE 115-*a* to adjust its transmission power quicker than if only two bits were used. The subsequent DL messages may be sent to the UE 15-*a* using a PDSCH or a PDCCH.

Figure 3:
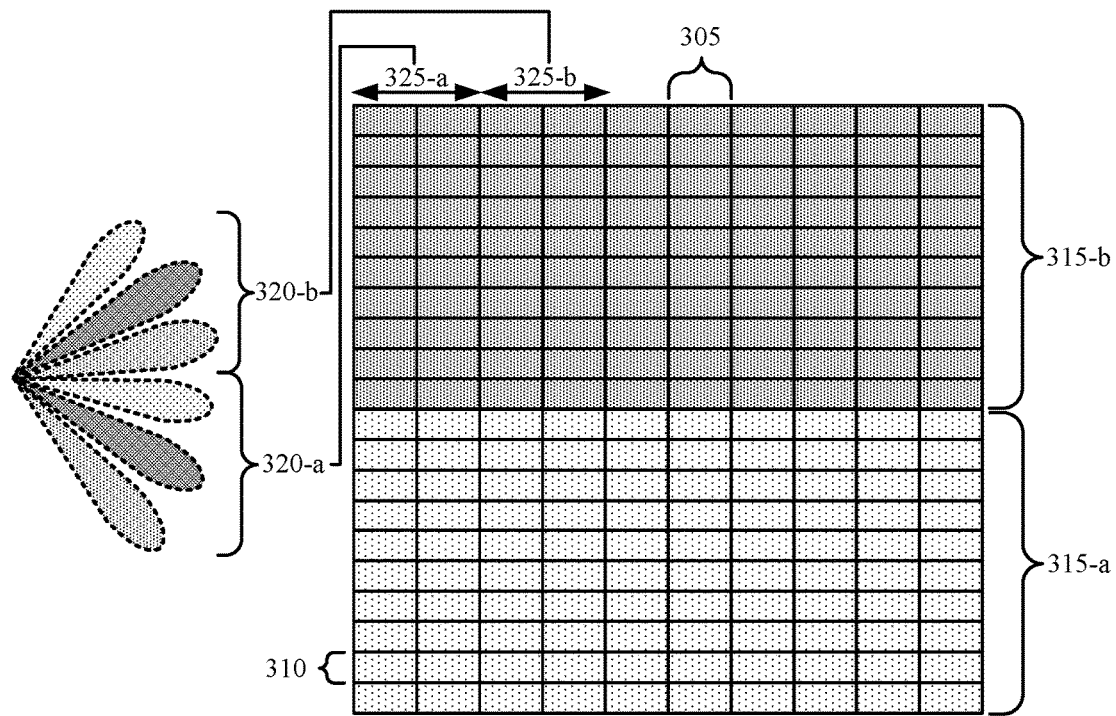
FIG. 3 illustrates an example of a random access channel (RACH) subframe that supports uplink transmit power control after beam change in accordance with aspects of the present disclosure.

FIG. 3 illustrates an example of a RACH subframe 300 for uplink transmit power control after beam change. In some cases, the RACH subframe 300 may represent aspects of techniques performed by a UE 115 or base station 105 as described with reference to FIGS. 1-2. In some cases, beam change requests, channel state indications, or DL messages indicating UL transmit power commands may be communicated through one or more regions of the RACH subframe 300.

RACH subframe 300 may include multiple symbols 305 and subcarriers 310 used by a UE 115 for the transmission of various signals. In some cases, RACH subframe 300 may include different radio frequency regions 315, where each frequency region may include multiple subcarriers 310. In some cases, these frequency regions 315 may be associated with different types of transmissions. For example, a first set of subcarriers 310-*a* may be used for a random access message transmissions, where a random access message may be transmitted using, or spread across, multiple symbols 305. A second set of subcarriers 310-*b* may be used for the transmission of signals that are not associated with random access processes.

In an example, second frequency region 315-*b* may be used or reserved for transmitting messages other than RACH transmissions. For example, second frequency region 315-*b* may be used for scheduling requests (SR). In some cases, a UE 115 may use a second set of subcarriers 310-*b* to transmit a scheduling request over multiple symbols 305 while the first frequency region may be reserved for RACH preamble transmissions. The first frequency region 315-*a* and the second frequency region 315-*b* may not overlap.

In some cases, a UE 115 may send a beam change request or a channel quality indication using subcarriers 310 within frequency region 315-*a* of the RACH subframe 300 that is reserved for RACH transmissions. In other cases, a UE 115 may send a beam change request or a channel quality indication using subcarriers 310 within frequency range 315-*b* used for transmissions other than RACH transmissions, such as scheduling requests. In a similar manner, DL messages, such as control messages containing UL transmission power settings, may be sent through either frequency region 315-*a* or frequency range 315-*b* of the RACH subframe 300. In some cases, utilizing the frequency range 315-*b* region of the RACH subframe 300 may allow for more UEs 115 to communicate with a base station 105 simultaneously due to the increased degrees of freedom within this region.

A UE 115 may select which frequency region 315 to use based on a timing alignment between the UE 115 and a base station 105. For example, a UE 115 may determine a timing alignment with respect to a base station 105, and if the timing alignment is within a certain range (i.e., closely aligned), then the UE 115 may attempt to send the beam change request through the second frequency range 315-*b* (e.g., an SR region) of the RACH sub-frame 300. However, if the timing alignment is outside of a certain range (i.e., not closely aligned), then the UE 115 may send the beam change request using the frequency range 315-*a* associated with RACH signaling.

Figure 4:
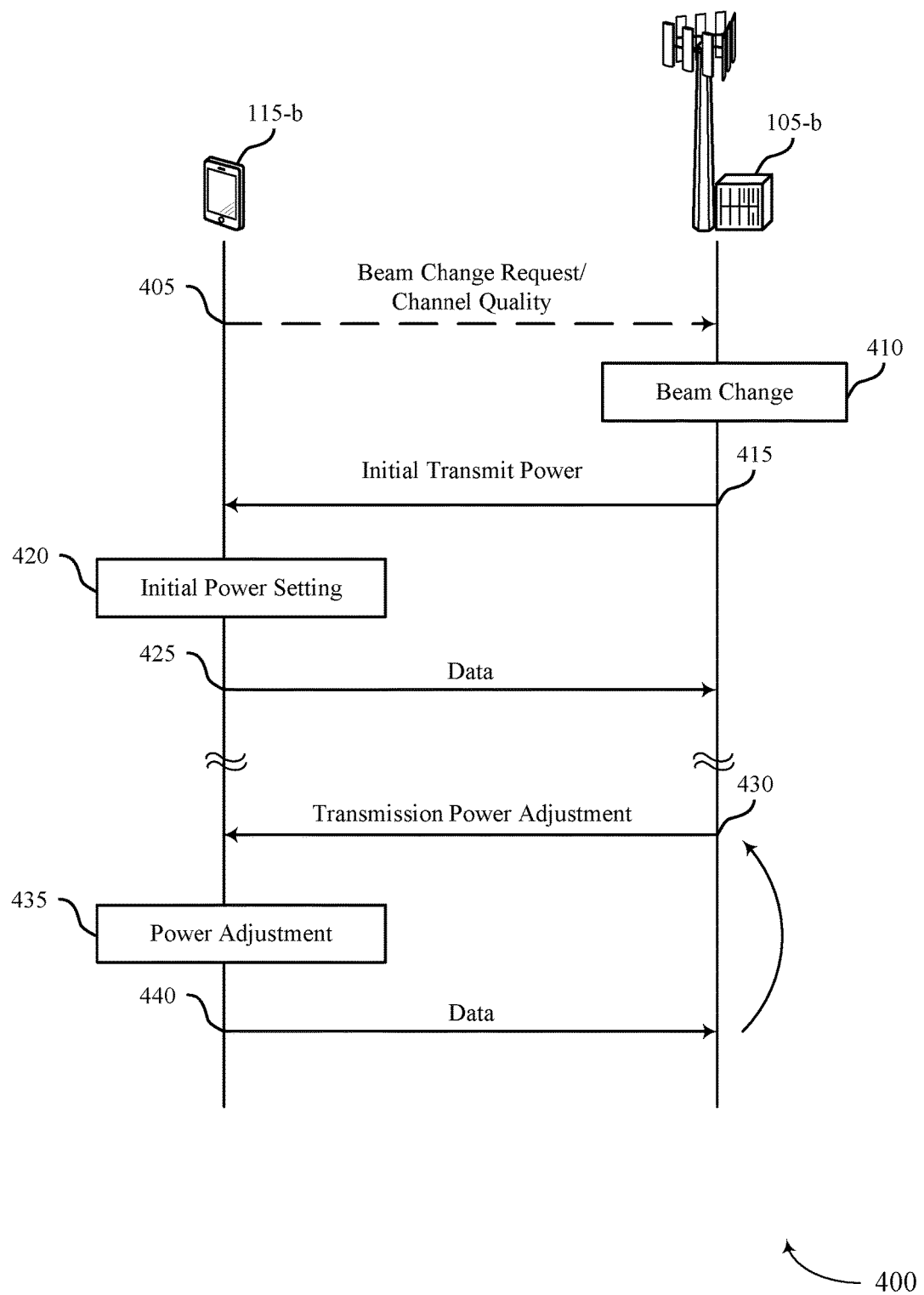
FIG. 4 illustrates an example of a process flow that supports uplink transmit power control after beam change in accordance with aspects of the present disclosure.

FIG. 4 illustrates an example of a process flow 400 for uplink transmit power control after beam change. Process flow 400 may include UE 115-*b* and base station 105-*b*, which may be examples of or which may represent aspects of techniques performed by a UE 115 or base station 105 as described with reference to FIGS. 1-3. Process flow 400 may include the transmission of requests to change an active beam and the transmission of UL transmit power commands for UE 115-*b* to use for initial or subsequent UL communications.

Initially, the UE 115-*b* may transmit, and the base station 105-*b* may receive, a beam change indication message 405. The beam change indication message 405 may include an explicit beam change request from the UE 115-*b*. In other cases, the beam change indication message 405 may include a CQI message or some other indication of the channel state. Transmitting the beam change indication message 405 may be in response to either the UE 115-*b* or the base station 105-*b* identifying a beam change condition, such as degraded channel conditions between the base station 105-*b* and UE 115-*b*.

The UE 115-*b* may transmit the beam change indication message 405 using one or more different transmission configurations or channels. The UE 115-*b* may transmit the beam change indication message 405 using a random access channel (RACH) configuration, such as a RACH preamble. For example, the UE 115-*b* may transmit the beam change indication message 405 using subcarriers of a RACH subframe reserved for RACH transmissions. In other cases, the UE 115-*b* transmit the beam change indication message 405 using subcarrier regions of a RACH subframe that are not reserved for RACH transmissions. For example, the UE 115-*b* may transmit the beam change indication message 405 using a scheduling request (SR) region of a RACH subframe. In yet other examples, the UE **115-*b* may transmit the beam change indication message 405** using the PUCCH.

In some cases, the UE **115-*b* may select which transmission configuration, channel, or subframe region to use for transmission of the beam change indication message 405 based on channel or alignment conditions at the UE 115-*b*. For example, the UE 115-*b* may first attempt to transmit the beam change indication message 405 using a PUCCH message. If the channel conditions are below a certain threshold, communications using PUCCH may be unsuccessful. For example, the conditions may have changed to an extent such that the UE 115-*b* may not be able to communicate using PUCCH on the currently active beam. In that case, the UE 115-*b* may determine a timing alignment with respect to the base station 105-*b*. If the timing alignment is within a certain range (i.e., closely aligned), then the UE 115-*b* may attempt to send the beam change indication message 405 through the SR region of a RACH sub-frame (or any other region of a RACH subframe not reserved for RACH transmissions). However, if the timing alignment is outside of a certain range (i.e., not closely aligned), then the UE 115-*b* may send the beam change indication message 405** using RACH signaling.

At block 410, the base station **105-*b* may perform a beam change process whereby the base station 105-*b* selects a new beam over which to communicate with the UE 115-*b*. Changing a beam may include transitioning from a first beam associated with a first direction within a cell of the base station 105-*b* to a second beam associated with a second direction within the same cell of the base station 105-*b***.

The base station **105-*b* may send, and the UE 115-*b* may receive, a DL message 415 associated with the beam change at block 410. The DL message 415 may include a transmission power indication. The DL message 415 may be sent in response to a beam change request, and therefore may be a beam change request response. In some cases, the base station 105-*b* may send the DL message 415 without receiving a previous request or similar message from the UE 115-*b*. The base station 105-*b* may send the DL message 415** using a PDSCH or a PDCCH.

In some cases, the DL message 415 includes initial transmission power settings for the UE **115-*b* to use for initial UL communications. The DL message 415 may include a certain number of bits arranged in a DCI format that are reserved for the initial transmission power setting. For example, the DL message 415 may contain three or more bits that are reserved for conveying the initial transmission power setting to the UE 115-*b*. In some cases, each bit may represent a different initial transmit power for the UE 115-*b*, which may range from −20 dB to 20 dB, for example. The base station 105-*b* may transmit a DL message 415 with a DCI format containing three or more bits to the UE 115-*b* each time a beam change 410** is performed.

At block 420, the UE **115-*b* performs an initial power setting adjustment for initial UL transmissions. The initial power adjustment may be based on a transmission power indication received in a DL message 415**.

The UE **115-*b* may then send, and the base station 105-*b* may receive, an UL transmission 425 at a power level that is based on the initial power adjustment performed at block 420**.

The base station **105-*b* may send, and the UE 115-*b* may receive, a subsequent DL message 430. In some cases, the DL message 430 contains a transmission power adjustment indication that informs the UE 115-*b* how to adjust its UL transmission power for subsequent UL communications. In an example, the DL message 430 is sent in response to a request from the UE 115-*b*** for UL transmission resources, such as in an UL grant message.

In some cases, the DL message 430 includes a number of bits reserved for the transmission power adjustment indication. The bits may be arranged in a DCI format. In some examples, the DL message 430 includes at least three bits reserved for the transmission power adjustment indication. The different power adjustment levels in the bits may range from −10 dB to 10 dB, for example. In some cases, prior to sending the DL message 430, the base station **105-*b* may identify two or more DCI formats with different numbers of bits reserved for the transmission power adjustment (i.e., different power adjustment fields), and may select a DCI format with a larger power adjustment field based on the beam change or channel conditions. In other cases, the base station 105-*b* may be statically configured to send the DL message 430 with a DCI format that includes three or more bits reserved for UL transmission power adjustment indications. The base station 105-*b* may send the DL message 430** using a PDSCH or a PDCCH.

At block 435, the UE **115-*b* may perform a transmission power adjustment based on the DL message 430. The UE 115-*b* may then send an UL transmission 440 at an adjusted power level based on the power adjustment 435. DL message 430, block 435, and UL transmission 440** may be repeated periodically or in some other manner in order to refine the transmission power adjustment.

Figure 5:
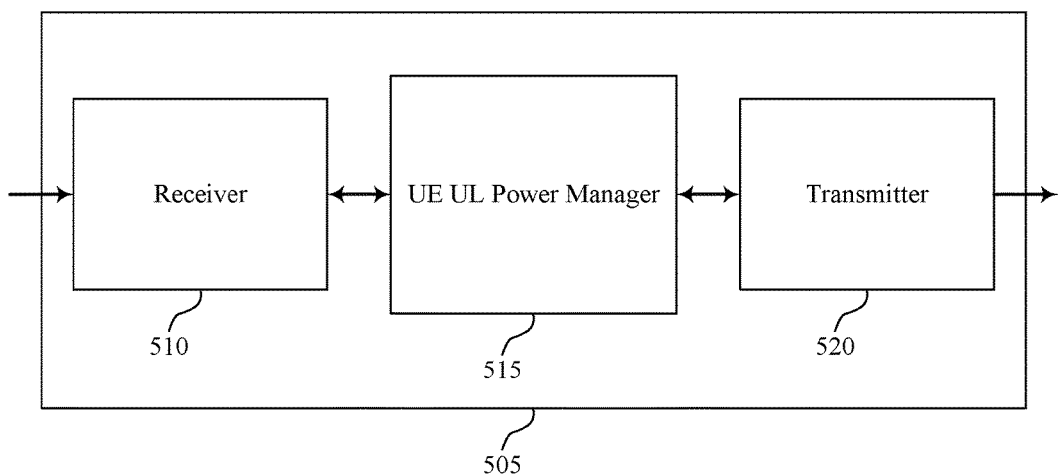
FIGS. 5 through 7 show block diagrams of a wireless device that supports uplink transmit power control after beam change in accordance with aspects of the present disclosure.

FIG. 5 shows a block diagram 500 of a wireless device 505 that supports uplink transmit power control after beam change in accordance with various aspects of the present disclosure. Wireless device 505 may be an example of aspects of a UE 115 as described with reference to FIGS. 1, 2, and 4. Wireless device 505 may include receiver 510, UE UL power manager 515, and transmitter 520. Wireless device 505 may additionally include a processor. Each of these components may be in communication with one another (e.g., via one or more buses).

The receiver 510 may receive information such as packets, user data, or control information associated with various information channels (e.g., control channels, data channels, and information related to title of the application, etc.). Information may be passed on to other components of the device. The receiver 510 may be an example of aspects of the transceiver 840 described with reference to FIG. 8.

The UE UL power manager 515 may identify a beam change, the beam change including a transition from a first transmission configuration based on a first beam direction of a cell to a second transmission configuration based on a second beam direction of the cell, receive a DL message associated with the beam change, where the DL message includes a transmission power indication, and transmit an UL message at a power level based on the transmission power indication. The UE UL power manager 515 may be an example of aspects of the UE UL power manager 815 described with reference to FIG. 8.

The transmitter 520 may transmit signals generated by other components of the device. In some examples, the transmitter 520 may be collocated with a receiver 510 in a transceiver module. For example, the transmitter 520 may be an example of aspects of the transceiver 840 described with reference to FIG. 8. The transmitter 520 may include a single antenna, or it may include a set of antennas.

Figure 6:
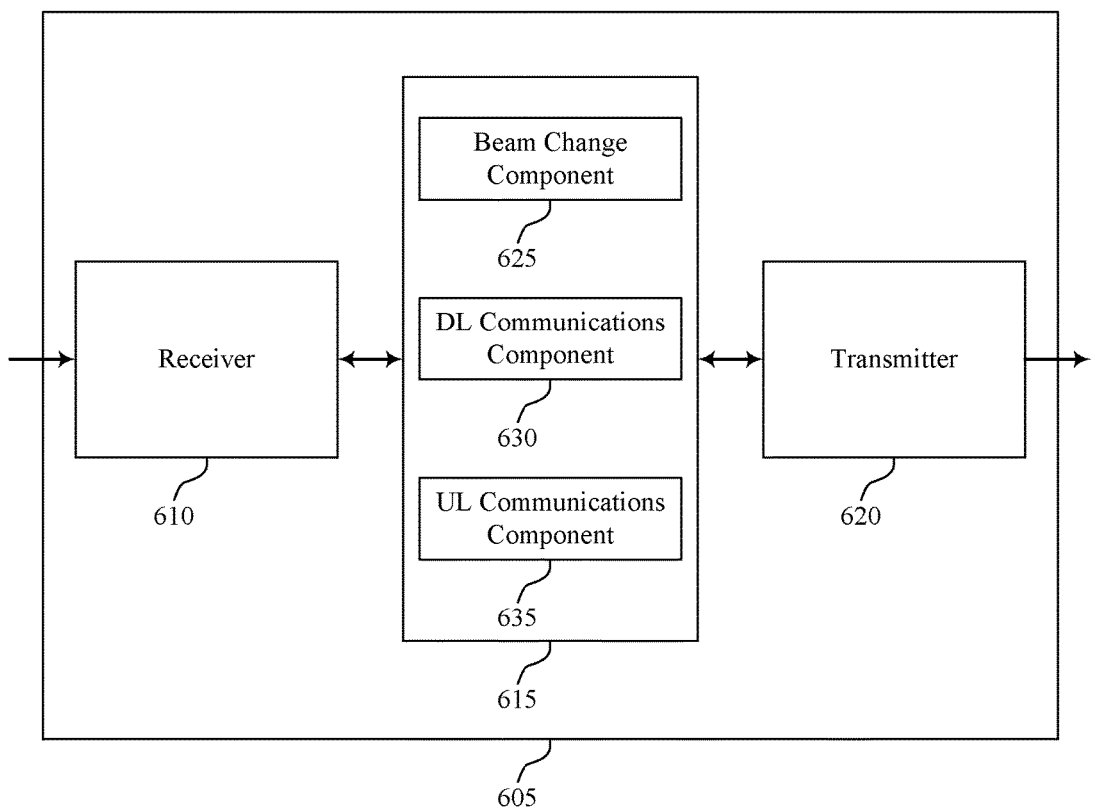

FIG. 6 shows a block diagram 600 of a wireless device 605 that supports uplink transmit power control after beam change in accordance with various aspects of the present disclosure. Wireless device 605 may be an example of aspects of a wireless device 505 or a UE 115 as described with reference to FIGS. 1, 2, 4 and 5. Wireless device 605 may include receiver 610, UE UL power manager 615, and transmitter 620. Wireless device 605 may additionally include a processor. Each of these components may be in communication with one another (e.g., via one or more buses).

The receiver 610 may receive information such as packets, user data, or control information associated with various information channels (e.g., control channels, data channels, and information related to title of the application, etc.). Information may be passed on to other components of the device. The receiver 610 may be an example of aspects of the transceiver 840 described with reference to FIG. 8.

The UE UL power manager 615 may be an example of aspects of the UE UL power manager 815 described with reference to FIG. 8. The UE UL power manager 615 may additionally include beam change component 625, DL communications component 630, and UL communications component 635.

The beam change component 625 may identify a beam change, the beam change including a transition from a first transmission configuration based on a first beam direction of a cell to a second transmission configuration based on a second beam direction of the cell.

The DL communications component 630 may receive a DL message associated with the beam change, where the DL message includes a transmission power indication and receives a subsequent DL message including a subsequent transmission power indication. In some cases, receiving the DL message includes receiving a beam change request response. In some cases, receiving the DL message includes receiving the DL message using a PDSCH or a PDCCH. In some cases, the DL message includes a number of bits reserved for an initial transmission power setting.

In some cases, the bits reserved for the initial transmission power setting are associated with a DCI format, where the number of bits is based on the beam change. In some cases, the number of bits is at least three. In some cases, the DL message includes a number of bits reserved for a transmission power adjustment indication. In some cases, the bits reserved for the transmission power adjustment indication is associated with a DCI format, where the number of bits is based on the beam change. In some cases, the number of bits is at least three. In some cases, receiving the subsequent DL message includes: receiving the subsequent DL message using a PDSCH or a PDCCH.

The UL communications component 635 may transmit an UL message at a power level based on the transmission power indication. The transmitter 620 may transmit signals generated by other components of the device. In some examples, the transmitter 620 may be collocated with a receiver 610 in a transceiver module. For example, the transmitter 620 may be an example of aspects of the transceiver 840 described with reference to FIG. 8. The transmitter 620 may include a single antenna, or it may include a set of antennas.

Figure 7:
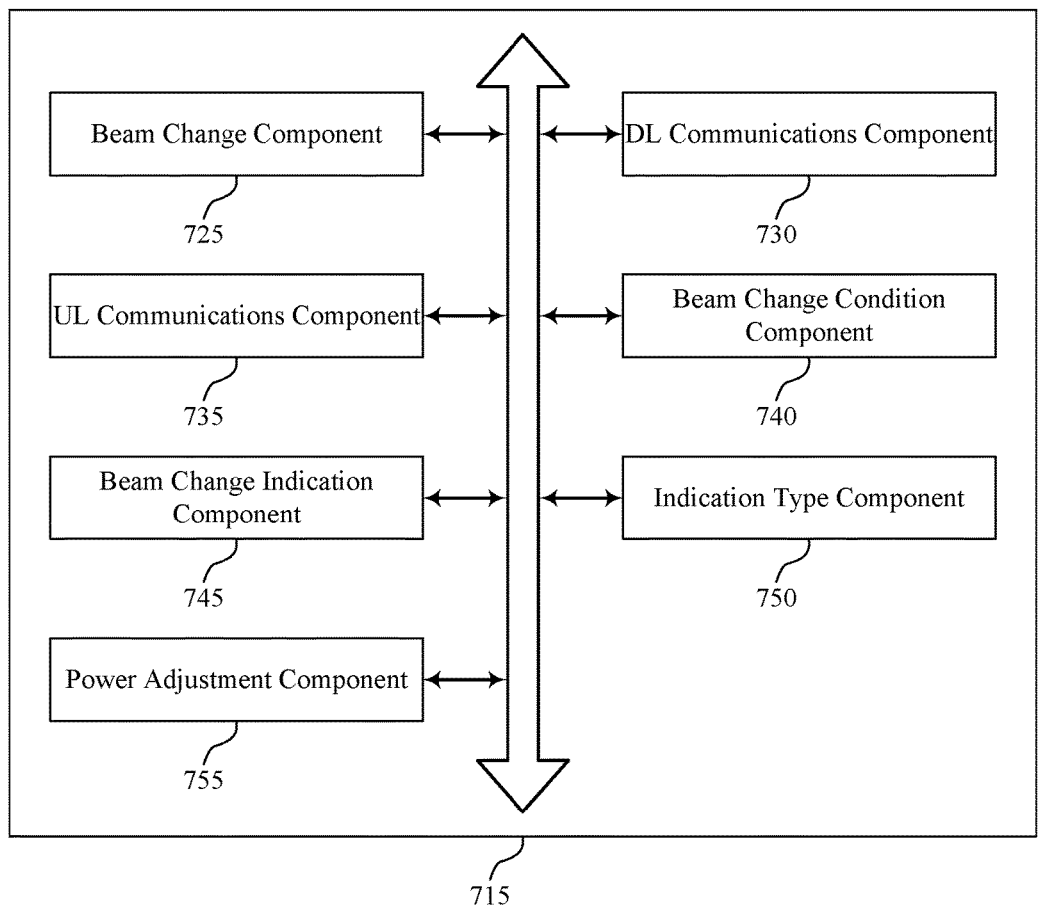

FIG. 7 shows a block diagram 700 of a UE UL power manager 715 that supports uplink transmit power control after beam change in accordance with various aspects of the present disclosure. The UE UL power manager 715 may be an example of aspects of a UE UL power manager 515, a UE UL power manager 615, or a UE UL power manager 815 described with reference to FIGS. 5, 6, and 8. The UE UL power manager 715 may include beam change component 725, DL communications component 730, and UL communications component 735. Each of these modules may communicate, directly or indirectly, with one another (e.g., via one or more buses).

The beam change component 725 may identify a beam change, the beam change including a transition from a first transmission configuration based on a first beam direction of a cell to a second transmission configuration based on a second beam direction of the cell.

The DL communications component 730 may receive a DL message associated with the beam change, where the DL message includes a transmission power indication and receive a subsequent DL message including a subsequent transmission power indication.

The UL communications component 735 may transmit an UL message at a power level based on the transmission power indication. The beam change condition component 740 may identify a beam change condition.

The beam change indication component 745 may transmit a beam change indication message based on the beam change condition, where the DL message is associated with the beam change indication message.

The indication type component 750 may determine whether the subsequent transmission power indication is associated with an initial transmission power setting or a transmission power adjustment indication. The power adjustment component 755 may adjust a transmission power based on the determining.

Figure 8:
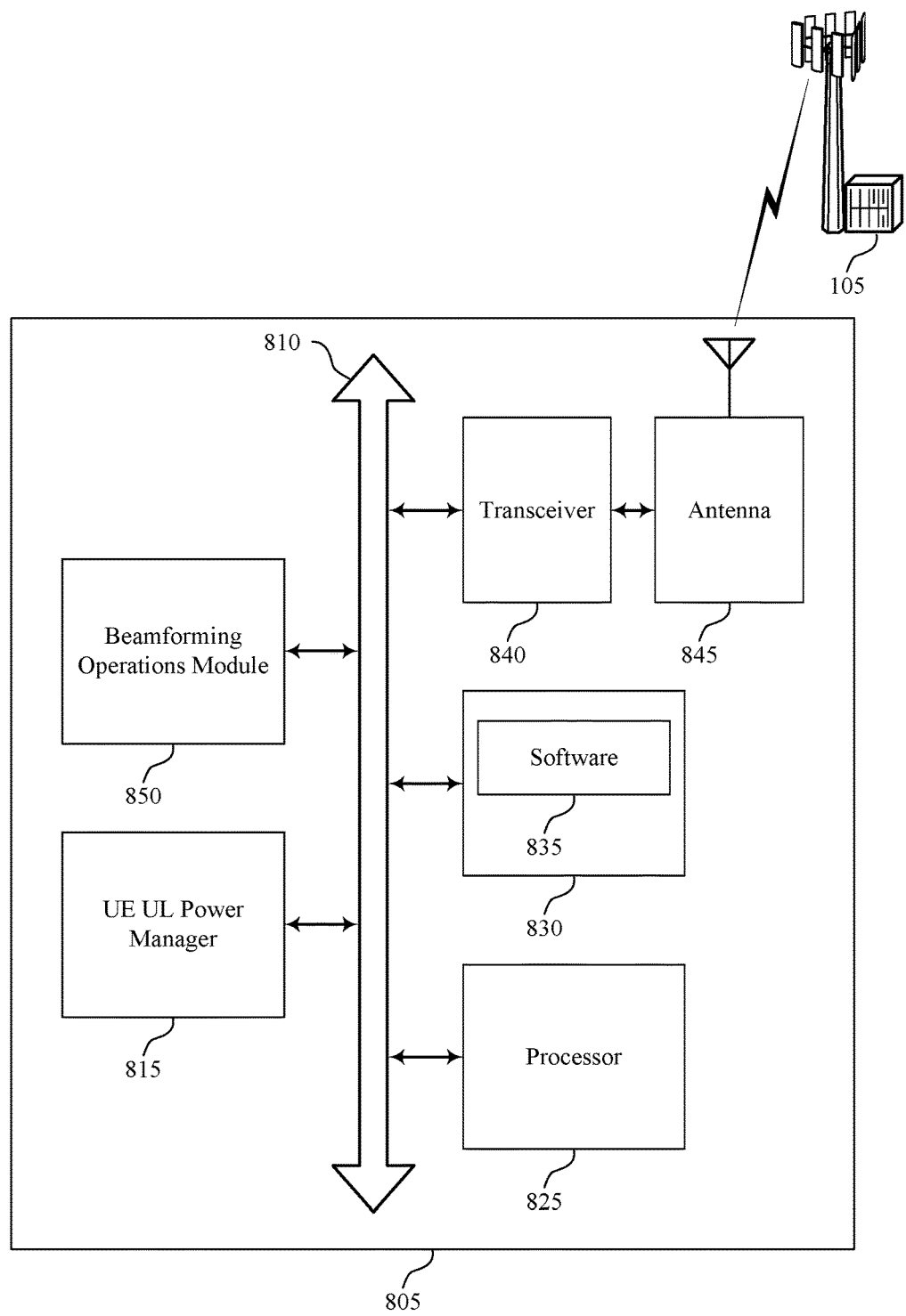
FIG. 8 illustrates a block diagram of a system including a user equipment (UE) that supports uplink transmit power control after beam change in accordance with aspects of the present disclosure.

FIG. 8 shows a diagram of a system 800 including a wireless device 805 that supports uplink transmit power control after beam change in accordance with various aspects of the present disclosure. Wireless device 805 may be an example of a wireless device 505, wireless device 605, or a UE 115 as described above, e.g., with reference to FIGS. 1, 2, 4, 5 and 6.

Wireless device 805 may include components for bi-directional voice and data communications including components for transmitting and receiving communications, including UE UL power manager 815, processor 825, memory 830, software 835, transceiver 840, antenna 845, and a beamforming operations module 850.

The processor 825 may include an intelligent hardware device, (e.g., a central processing unit (CPU), a microcontroller, an application specific integrated circuit (ASIC), etc.) The memory 830 may include random access memory (RAM) and read only memory (ROM). The memory 830 may store computer-readable, computer-executable software 35 including instructions that, when executed, cause the processor to perform various functions described herein (e.g., migration of a local gateway function, etc.). In some cases, the software 835 may not be directly executable by the processor but may cause a computer (e.g., when compiled and executed) to perform functions described herein.

The transceiver 840 may communicate bi-directionally, via one or more antennas, wired, or wireless links as described above. For example, the transceiver 1325 may communicate bi-directionally with another wireless device. The transceiver 840 may additionally include a modem to modulate the packets and provide the modulated packets to the antennas for transmission, and to demodulate packets received from the antennas.

In some cases, the wireless device may include a single antenna 845. However, in some cases the device may have more than one antenna 845, which may be capable of concurrently transmitting or receiving multiple wireless transmissions.

Figure 9:
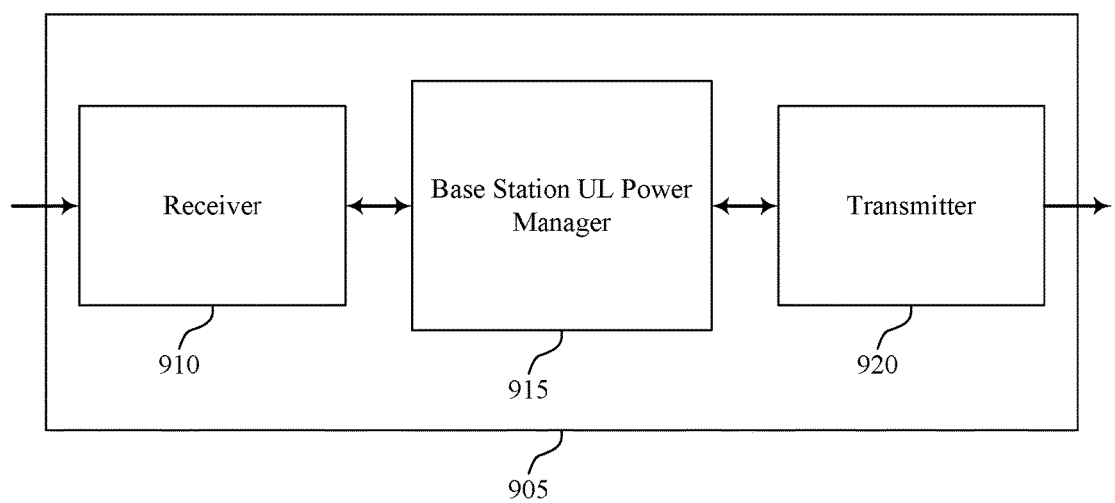
FIGS. 9 through 11 show block diagrams of a wireless device that supports uplink transmit power control after beam change in accordance with aspects of the present disclosure.

FIG. 9 shows a block diagram 900 of a wireless device 905 that supports uplink transmit power control after beam change in accordance with various aspects of the present disclosure. Wireless device 905 may be an example of aspects of a base station 105 as described with reference to FIGS. 1, 2, and 4. Wireless device 905 may include receiver 910, base station UL power manager 915, and transmitter 920. Wireless device 905 may additionally include a processor. Each of these components may be in communication with one another (e.g., via one or more buses).

The receiver 910 may receive information such as packets, user data, or control information associated with various information channels (e.g., control channels, data channels, and information related to title of the application, etc.). Information may be passed on to other components of the device. The receiver 910 may be an example of aspects of the transceiver 1240 described with reference to FIG. 12.

The base station UL power manager 915 may identify a beam change, the beam change including a transition from a first transmission configuration based on a first beam direction of a cell to a second transmission configuration based on a second beam direction of the cell, transmit a DL message associated with the beam change, where the DL message includes a transmission power indication, and receive an UL message at a power level based on the transmission power indication. The base station UL power manager 915 may be an example of aspects of the base station UL power manager 1215 described with reference to FIG. 12.

The transmitter 920 may transmit signals generated by other components of the device. In some examples, the transmitter 920 may be collocated with a receiver 910 in a transceiver module. For example, the transmitter 920 may be an example of aspects of the transceiver 1240 described with reference to FIG. 12. The transmitter 920 may include a single antenna, or it may include a set of antennas.

Figure 10:
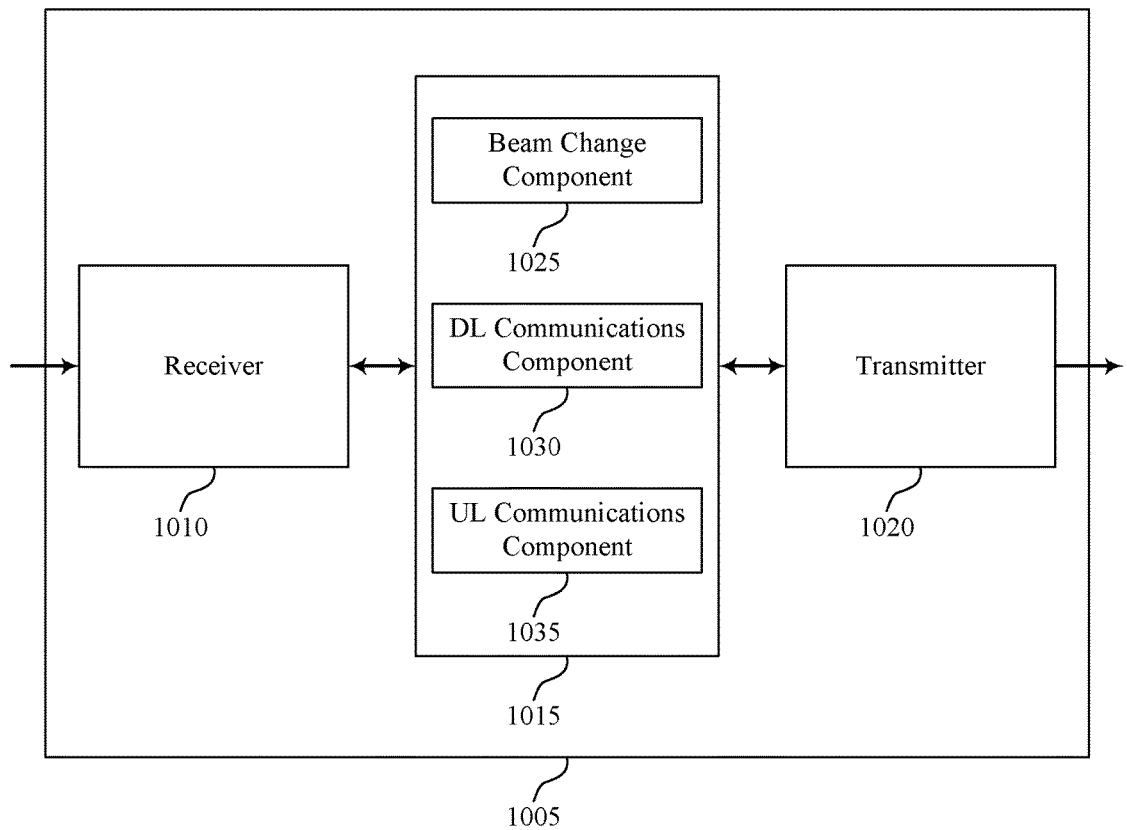

FIG. 10 shows a block diagram 1000 of a wireless device 1005 that supports uplink transmit power control after beam change in accordance with various aspects of the present disclosure. Wireless device 1005 may be an example of aspects of a wireless device 905 or a base station 105 as described with reference to FIGS. 1, 2, 4, and 9. Wireless device 1005 may include receiver 1010, base station UL power manager 1015, and transmitter 1020. Wireless device 1005 may additionally include a processor. Each of these components may be in communication with one another (e.g., via one or more buses).

The receiver 1010 may receive information such as packets, user data, or control information associated with various information channels (e.g., control channels, data channels, and information related to title of the application, etc.). Information may be passed on to other components of the device. The receiver 1010 may be an example of aspects of the transceiver 1240 described with reference to FIG. 12.

The base station UL power manager 1015 may be an example of aspects of the base station UL power manager 1215 described with reference to FIG. 12. The base station UL power manager 1015 may additionally include beam change component 1025, DL communications component 1030, and UL communications component 1035.

The beam change component 1025 may identify a beam change, the beam change including a transition from a first transmission configuration based on a first beam direction of a cell to a second transmission configuration based on a second beam direction of the cell.

The DL communications component 1030 may transmit a DL message associated with the beam change, where the DL message includes a transmission power indication and transmit the subsequent DL message. In some cases, transmitting the DL message includes transmitting a beam change request response. In some cases, transmitting the DL message includes transmitting the DL message using a PDSCH or a PDCCH. In some cases, transmitting the subsequent DL message includes: transmitting the subsequent DL message using a PDSCH or a PDCCH.

The UL communications component 1035 may receive an UL message at a power level based on the transmission power indication. The transmitter 1020 may transmit signals generated by other components of the device. In some examples, the transmitter 1020 may be collocated with a receiver 1010 in a transceiver module. For example, the transmitter 1020 may be an example of aspects of the transceiver 1240 described with reference to FIG. 12. The transmitter 1020 may include a single antenna, or it may include a set of antennas.

Figure 11:
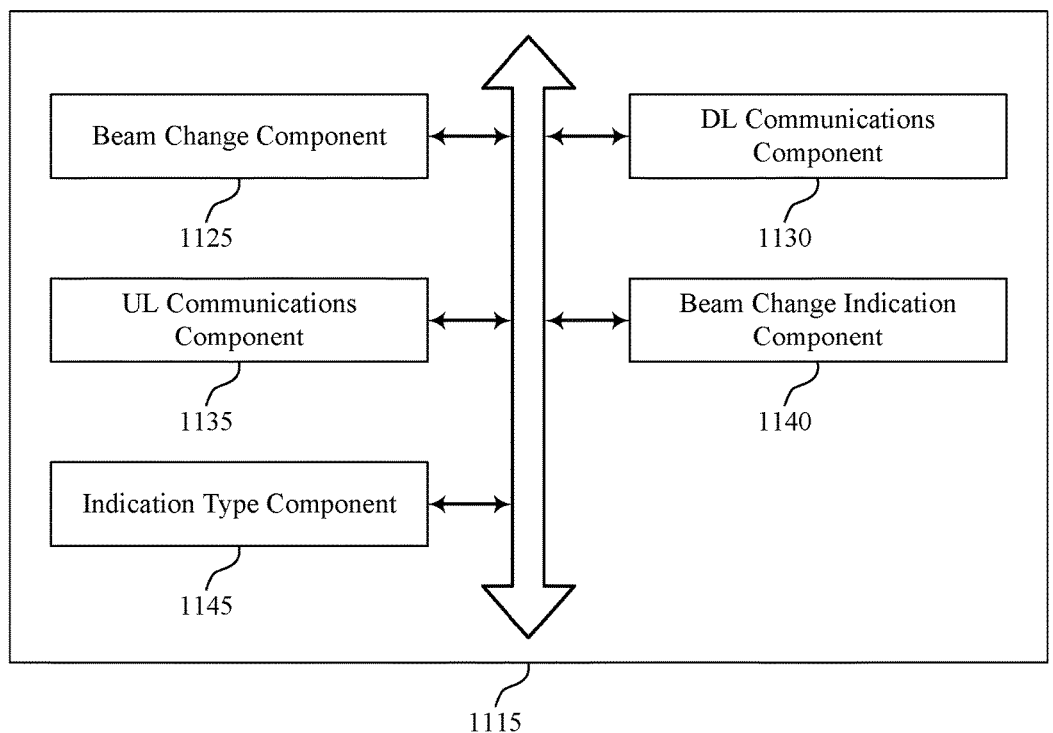

FIG. 11 shows a block diagram 1100 of a base station UL power manager 1115 that supports uplink transmit power control after beam change in accordance with various aspects of the present disclosure. The base station UL power manager 1115 may be an example of aspects of a base station UL power manager 915, a base station UL power manager 1015, or a base station UL power manager 1215 described with reference to FIGS. 9, 10, and 12. The base station UL power manager 1115 may include beam change component 1125, DL communications component 1130, and UL communications component 1135. Each of these modules may communicate, directly or indirectly, with one another (e.g., via one or more buses).

The beam change component 1125 may identify a beam change, the beam change including a transition from a first transmission configuration based on a first beam direction of a cell to a second transmission configuration based on a second beam direction of the cell.

The DL communications component 1130 may transmit a DL message associated with the beam change, where the DL message includes a transmission power indication and transmit the subsequent DL message. In some cases, transmitting the DL message includes: transmitting a beam change request response.

The UL communications component 1135 may receive an UL message at a power level based on the transmission power indication. The beam change indication component 1140 may receive a beam change indication message, where the DL message is associated with the beam change indication message. The indication type component 1145 may determine whether to transmit an initial transmission power setting or a transmission power adjustment indication in a subsequent DL message.

Figure 12:
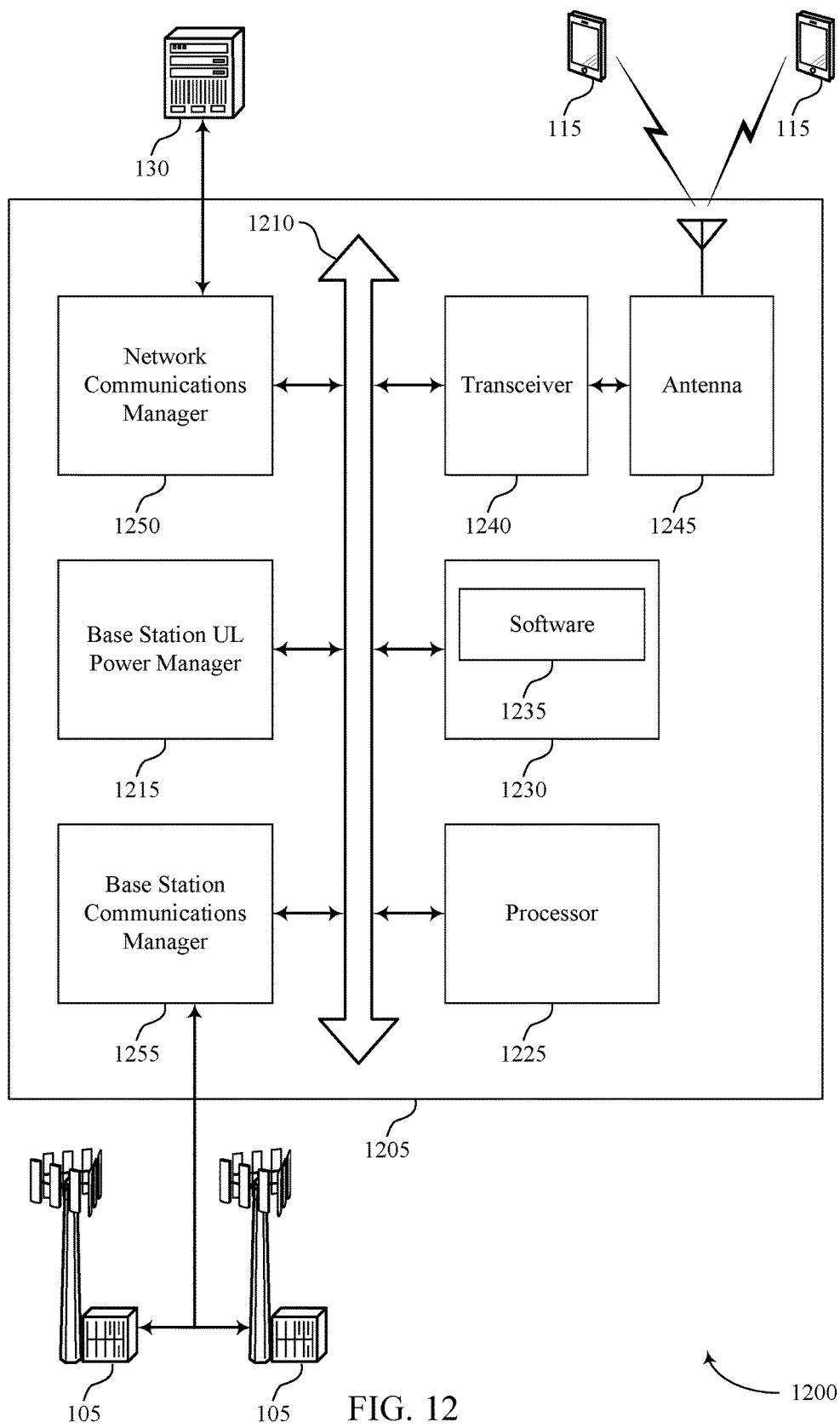
FIG. 12 illustrates a block diagram of a system including a base station that supports uplink transmit power control after beam change in accordance with aspects of the present disclosure.

FIG. 12 shows a diagram of a system 1200 including a wireless device 1205 that supports uplink transmit power control after beam change in accordance with various aspects of the present disclosure. Wireless device 1205 may be an example of a wireless device 905, wireless device 1005, or a base station 105 as described above, e.g., with reference to FIGS. 1, 2, 4, 9 and 10.

Wireless device 1205 may include components for bi-directional voice and data communications including components for transmitting and receiving communications, including base station UL power manager 1215, processor 1225, memory 1230, software 1235, transceiver 1240, antenna 1245, network communications manager 1250, and base station communications manager 1255.

The processor 1225 may include an intelligent hardware device, (e.g., a central processing unit (CPU), a microcontroller, an application specific integrated circuit (ASIC), etc.) The memory 1230 may include random access memory (RAM) and read only memory (ROM). The memory 1230 may store computer-readable, computer-executable software 35 including instructions that, when executed, cause the processor to perform various functions described herein (e.g., migration of a local gateway function, etc.). In some cases, the software 1235 may not be directly executable by the processor but may cause a computer (e.g., when compiled and executed) to perform functions described herein.

The transceiver 1240 may communicate bi-directionally, via one or more antennas, wired, or wireless links as described above. For example, the transceiver 1325 may communicate bi-directionally with another wireless device. The transceiver 1240 may additionally include a modem to modulate the packets and provide the modulated packets to the antennas for transmission, and to demodulate packets received from the antennas. In some cases, the wireless device may include a single antenna 1245. However, in some cases the device may have more than one antenna 1245, which may be capable of concurrently transmitting or receiving multiple wireless transmissions.

The network communications manager 1250 may manage communications with the core network (e.g., via one or more wired backhaul links). For example, the network communications manager 1250 may manage the transfer of data communications for client devices, such as one or more UEs 115.

The base station communications manager 1255 may manage communications with other base station 105, and may include a controller or scheduler for controlling communications with UEs 115 in cooperation with other base stations 105. For example, the base station communications manager 1255 may coordinate scheduling for transmissions to UEs 115 for various interference mitigation techniques such as beamforming or joint transmission. In some examples, base station communications manager 1255 may provide an X2 interface within an LTE/LTE-A wireless communication network technology to provide communication between base stations 105.

Figure 13:
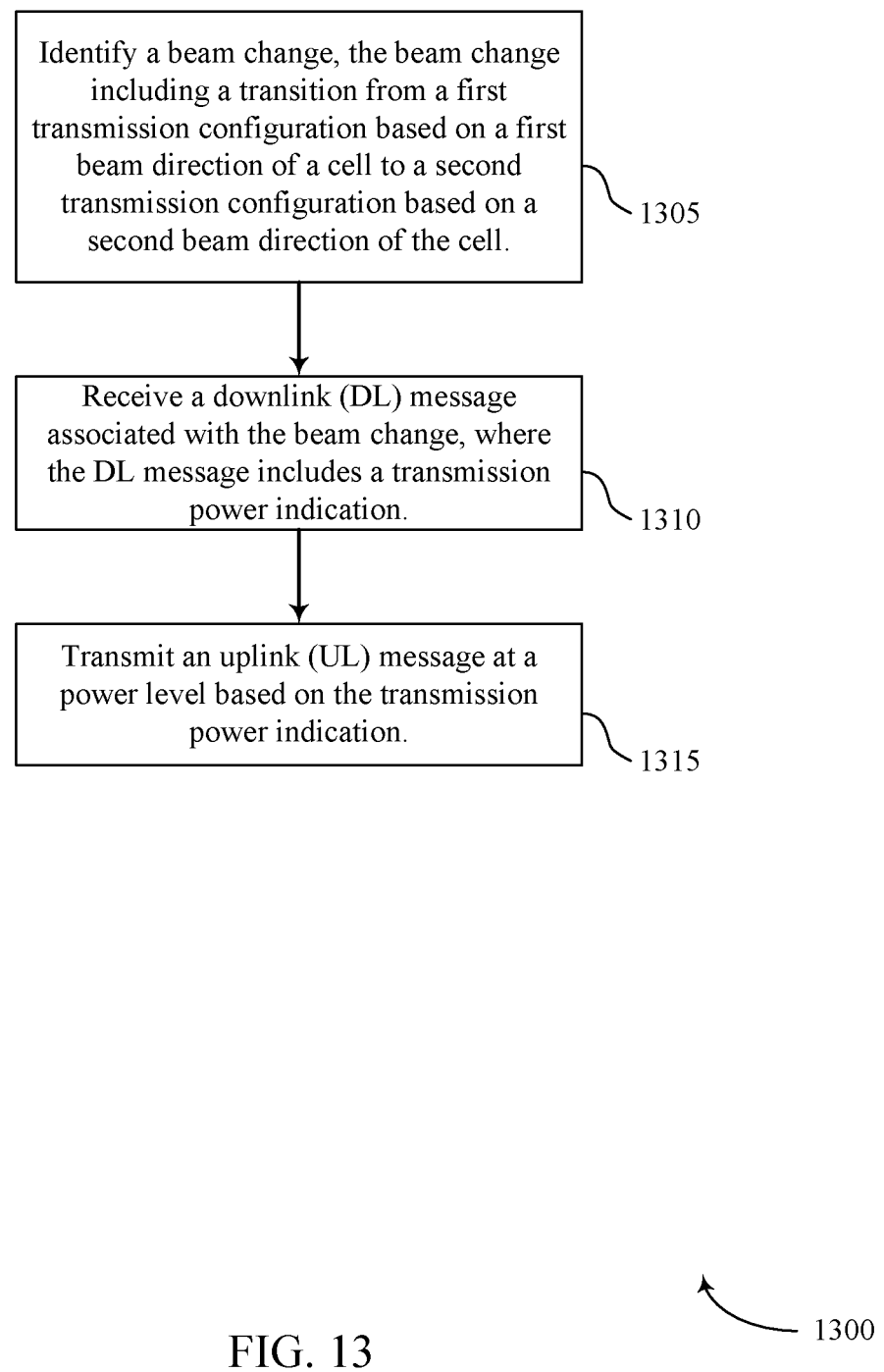
FIGS. 13 through 18 illustrate methods for uplink transmit power control after beam change in accordance with aspects of the present disclosure.

FIG. 13 shows a flowchart illustrating a method 1300 for uplink transmit power control after beam change in accordance with various aspects of the present disclosure. The operations of method 1300 may be implemented by a UE 115 or its components as described herein. For example, the operations of method 1300 may be performed by a UE UL power manager as described with reference to FIGS. 5 through 7. In some examples, a UE 115 may execute a set of codes to control the functional elements of the device to perform the functions described below. Additionally or alternatively, the UE 115 may perform aspects the functions described below using special-purpose hardware.

At block 1305, the UE 115 may identify a beam change, the beam change including a transition from a first transmission configuration based on a first beam direction of a cell to a second transmission configuration based on a second beam direction of the cell. The operations of block 1305 may be performed according to the methods described with reference to FIGS. 2 through 4. In certain examples, the operations of block 1305 may be performed by a beam change component as described with reference to FIGS. 5 through 7.

At block 1310, the UE 115 may receive a DL message associated with the beam change, where the DL message includes a transmission power indication. The operations of block 1310 may be performed according to the methods described with reference to FIGS. 2 through 4. In certain examples, the operations of block 1310 may be performed by a DL communications component as described with reference to FIGS. 5 through 7.

At block 1315, the UE 115 may transmit an UL message at a power level based on the transmission power indication. The operations of block 1315 may be performed according to the methods described with reference to FIGS. 2 through 4. In certain examples, the operations of block 1315 may be performed by an UL communications component as described with reference to FIGS. 5 through 7.

Figure 14:
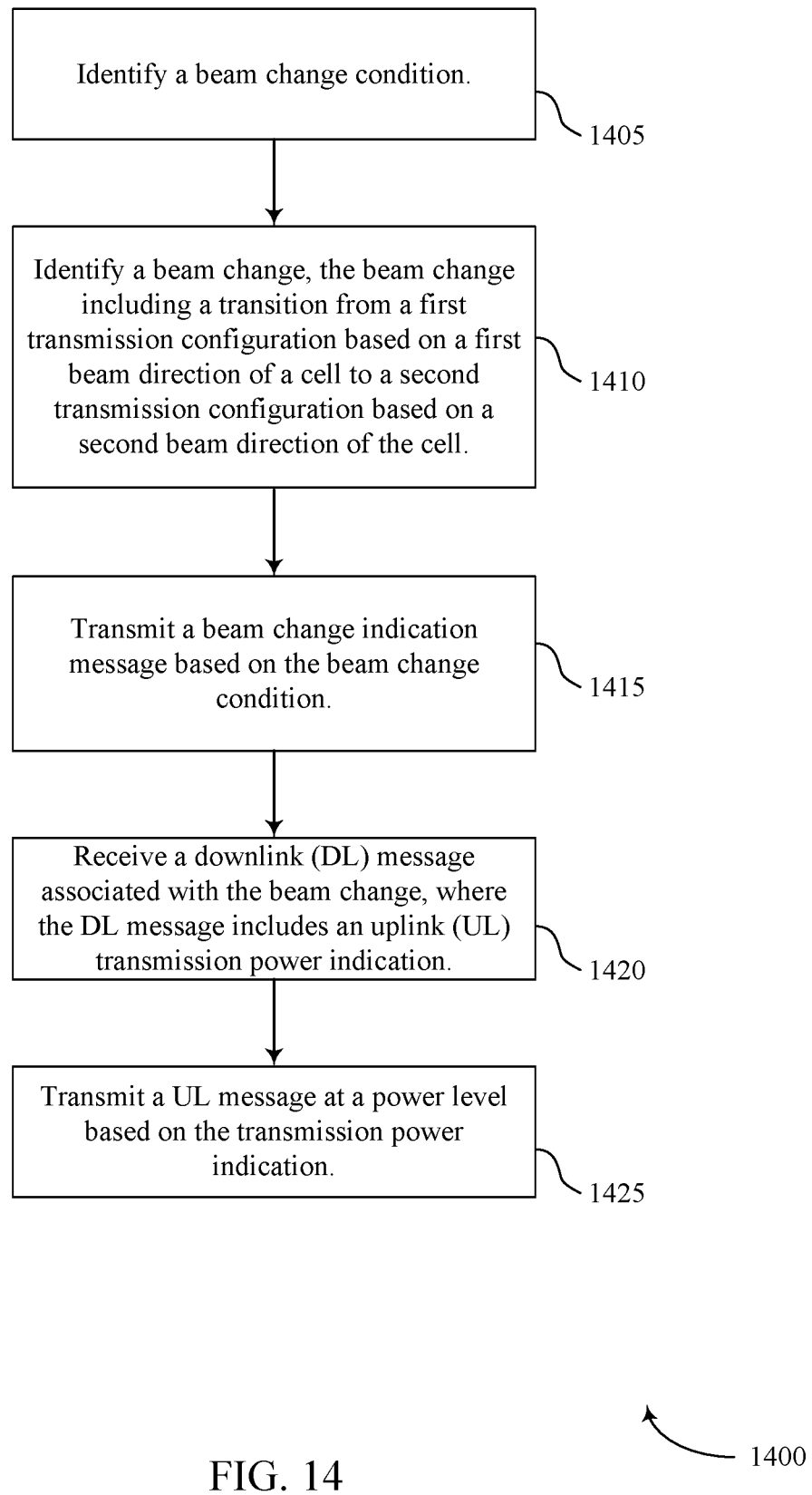

FIG. 14 shows a flowchart illustrating a method 1400 for uplink transmit power control after beam change in accordance with various aspects of the present disclosure. The operations of method 1400 may be implemented by a UE 115 or its components as described herein. For example, the operations of method 1400 may be performed by a UE UL power manager as described with reference to FIGS. 5 through 7. In some examples, a UE 115 may execute a set of codes to control the functional elements of the device to perform the functions described below. Additionally or alternatively, the UE 115 may perform aspects the functions described below using special-purpose hardware.

At block 1405, the UE 115 may identify a beam change condition. The operations of block 1405 may be performed according to the methods described with reference to FIGS. 2 through 4. In certain examples, the operations of block 1405 may be performed by a beam change condition component as described with reference to FIGS. 5 through 7.

At block 1410, the UE 115 may identify a beam change, the beam change including a transition from a first transmission configuration based on a first beam direction of a cell to a second transmission configuration based on a second beam direction of the cell. The beam change may be based on the beam change condition identified in block 1405. The operations of block 1410 may be performed according to the methods described with reference to FIGS. 2 through 4. In certain examples, the operations of block 1410 may be performed by a beam change component as described with reference to FIGS. 5 through 7.

At block 1415, the UE 115 may transmit a beam change indication message based on the beam change condition. The operations of block 1415 may be performed according to the methods described with reference to FIGS. 2 through 4. In certain examples, the operations of block 1415 may be performed by a beam change indication component as described with reference to FIGS. 5 through 7.

At block 1420, the UE 115 may receive a DL message associated with the beam change, where the DL message includes an UL transmission power indication. The operations of block 1420 may be performed according to the methods described with reference to FIGS. 2 through 4. In certain examples, the operations of block 1420 may be performed by a DL communications component as described with reference to FIGS. 5 through 7.

At block 1425, the UE 115 may transmit an UL message at a power level based on the transmission power indication. The operations of block 1425 may be performed according to the methods described with reference to FIGS. 2 through 4. In certain examples, the operations of block 1425 may be performed by an UL communications component as described with reference to FIGS. 5 through 7.

Figure 15:
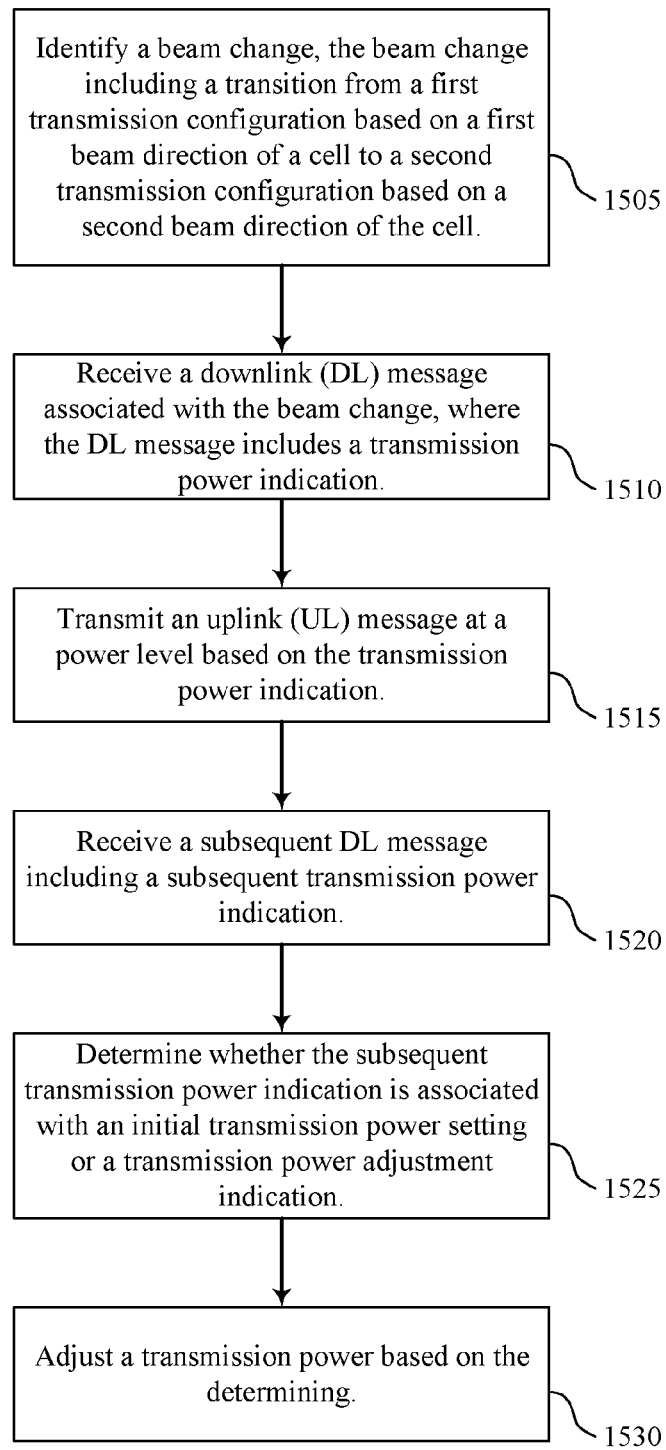

FIG. 15 shows a flowchart illustrating a method 1500 for uplink transmit power control after beam change in accordance with various aspects of the present disclosure. The operations of method 1500 may be implemented by a UE 115 or its components as described herein. For example, the operations of method 1500 may be performed by a UE UL power manager as described with reference to FIGS. 5 through 7. In some examples, a UE 115 may execute a set of codes to control the functional elements of the device to perform the functions described below. Additionally or alternatively, the UE 115 may perform aspects the functions described below using special-purpose hardware.

At block 1505, the UE 115 may identify a beam change, the beam change including a transition from a first transmission configuration based on a first beam direction of a cell to a second transmission configuration based on a second beam direction of the cell. The operations of block 1505 may be performed according to the methods described with reference to FIGS. 2 through 4. In certain examples, the operations of block 1505 may be performed by a beam change component as described with reference to FIGS. 5 through 7.

At block 1510, the UE 115 may receive a DL message associated with the beam change, where the DL message includes a transmission power indication. The operations of block 1510 may be performed according to the methods described with reference to FIGS. 2 through 4. In certain examples, the operations of block 1510 may be performed by a DL communications component as described with reference to FIGS. 5 through 7.

At block 1515, the UE 115 may transmit an UL message at a power level based on the transmission power indication. The operations of block 1515 may be performed according to the methods described with reference to FIGS. 2 through 4. In certain examples, the operations of block 1515 may be performed by an UL communications component as described with reference to FIGS. 5 through 7.

At block 1520, the UE 115 may receive a subsequent DL message including a subsequent transmission power indication. The operations of block 1520 may be performed according to the methods described with reference to FIGS. 2 through 4. In certain examples, the operations of block 1520 may be performed by a DL communications component as described with reference to FIGS. 5 through 7.

At block 1525, the UE 115 may determine whether the subsequent transmission power indication is associated with an initial transmission power setting or a transmission power adjustment indication. The operations of block 1525 may be performed according to the methods described with reference to FIGS. 2 through 4. In certain examples, the operations of block 1525 may be performed by an indication type component as described with reference to FIGS. 5 through 7.

At block 1530, the UE 115 may adjust a transmission power based on the determining. The operations of block 1530 may be performed according to the methods described with reference to FIGS. 2 through 4. In certain examples, the operations of block 1530 may be performed by a power adjustment component as described with reference to FIGS. 5 through 7.

Figure 16:
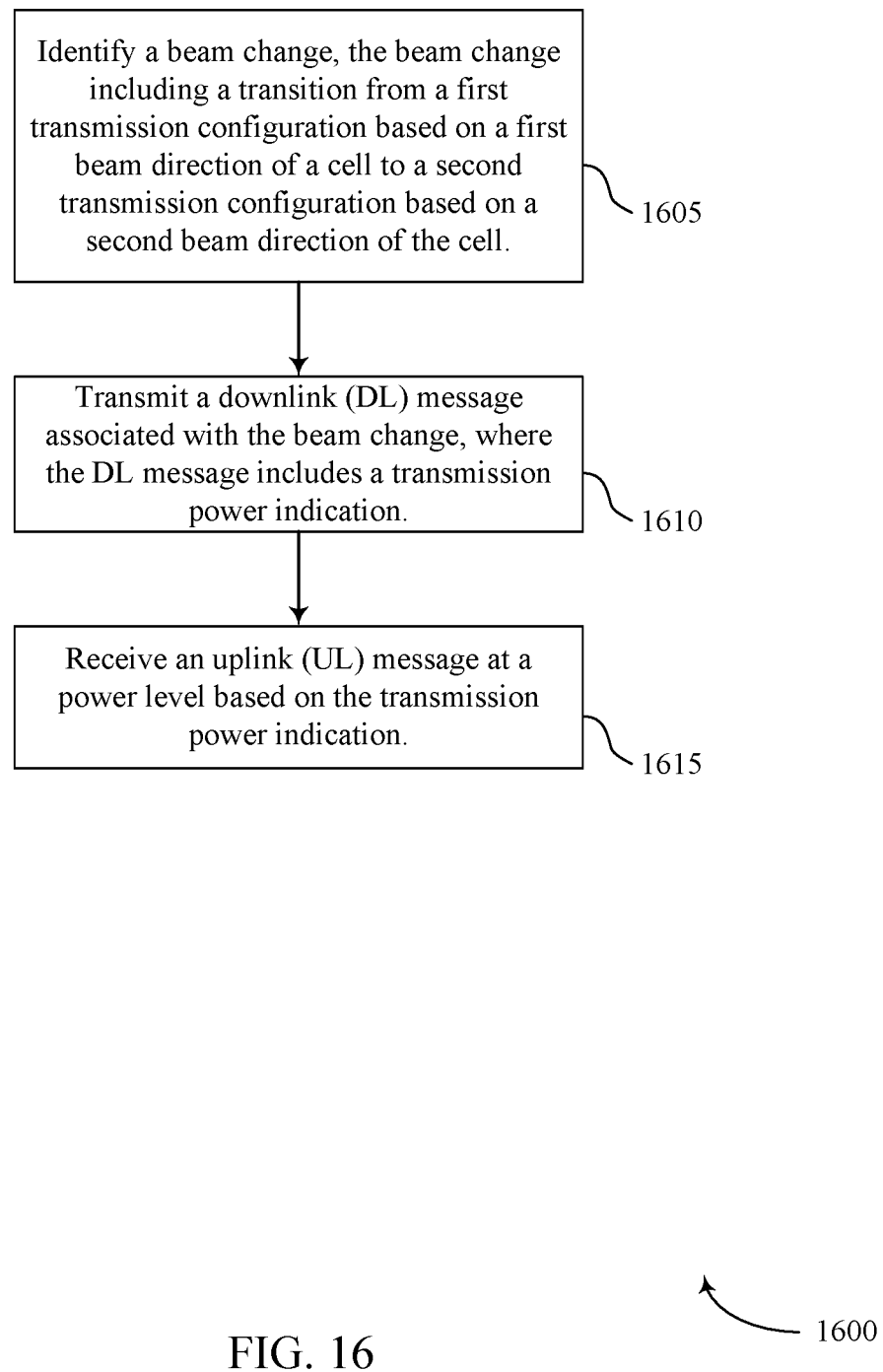

FIG. 16 shows a flowchart illustrating a method 1600 for uplink transmit power control after beam change in accordance with various aspects of the present disclosure. The operations of method 1600 may be implemented by a base station 105 or its components as described herein. For example, the operations of method 1600 may be performed by a base station UL power manager as described with reference to FIGS. 9 through 11. In some examples, a base station 105 may execute a set of codes to control the functional elements of the device to perform the functions described below. Additionally or alternatively, the base station 105 may perform aspects the functions described below using special-purpose hardware.

At block 1605, the base station 105 may identify a beam change, the beam change including a transition from a first transmission configuration based on a first beam direction of a cell to a second transmission configuration based on a second beam direction of the cell. The operations of block 1605 may be performed according to the methods described with reference to FIGS. 2 through 4. In certain examples, the operations of block 1605 may be performed by a beam change component as described with reference to FIGS. 9 through 11.

At block 1610, the base station 105 may transmit a DL message associated with the beam change, where the DL message includes a transmission power indication. The operations of block 1610 may be performed according to the methods described with reference to FIGS. 2 through 4. In certain examples, the operations of block 1610 may be performed by a DL communications component as described with reference to FIGS. 9 through 11.

At block 1615, the base station 105 may receive an UL message at a power level based on the transmission power indication. The operations of block 1615 may be performed according to the methods described with reference to FIGS. 2 through 4. In certain examples, the operations of block 1615 may be performed by an UL communications component as described with reference to FIGS. 9 through 11.

Figure 17:
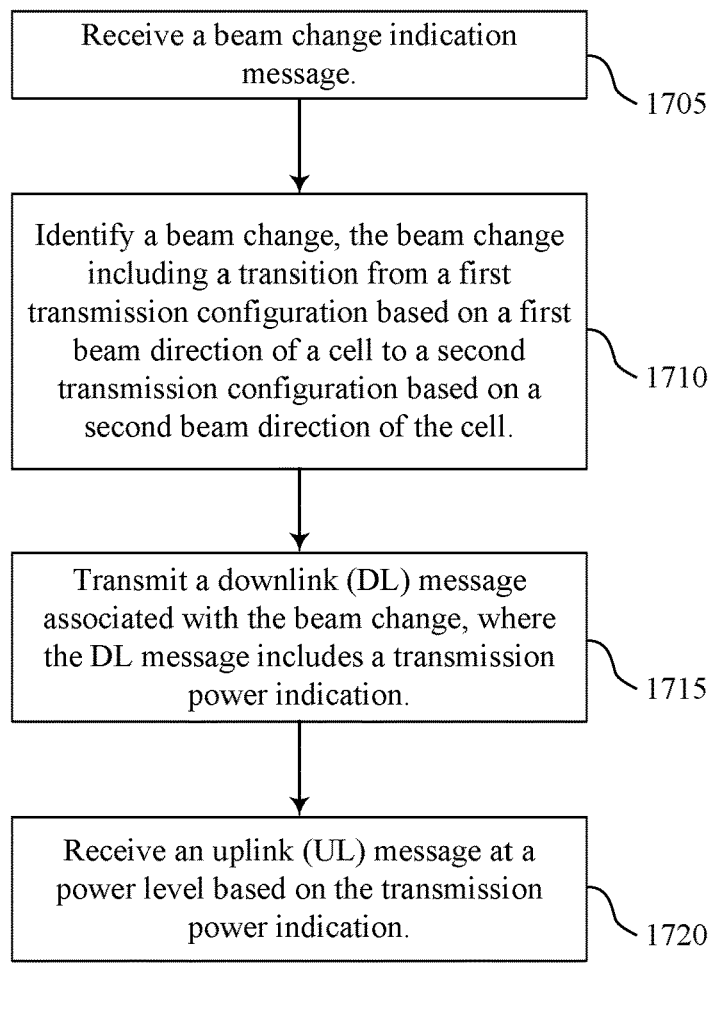

FIG. 17 shows a flowchart illustrating a method 1700 for uplink transmit power control after beam change in accordance with various aspects of the present disclosure. The operations of method 1700 may be implemented by a base station 105 or its components as described herein. For example, the operations of method 1700 may be performed by a base station UL power manager as described with reference to FIGS. 9 through 11. In some examples, a base station 105 may execute a set of codes to control the functional elements of the device to perform the functions described below. Additionally or alternatively, the base station 105 may perform aspects the functions described below using special-purpose hardware.

At block 1705, the base station 105 may receive a beam change indication message. The operations of block 1705 may be performed according to the methods described with reference to FIGS. 2 through 4. In certain examples, the operations of block 1705 may be performed by a beam change indication component as described with reference to FIGS. 9 through 11.

At block 1710, the base station 105 may identify a beam change, the beam change including a transition from a first transmission configuration based on a first beam direction of a cell to a second transmission configuration based on a second beam direction of the cell. The operations of block 1710 may be performed according to the methods described with reference to FIGS. 2 through 4. In certain examples, the operations of block 1710 may be performed by a beam change component as described with reference to FIGS. 9 through 11.

At block 1715, the base station 105 may transmit a DL message associated with the beam change, where the DL message includes a transmission power indication. The operations of block 1715 may be performed according to the methods described with reference to FIGS. 2 through 4. In certain examples, the operations of block 1715 may be performed by a DL communications component as described with reference to FIGS. 9 through 11.

At block 1720, the base station 105 may receive an UL message at a power level based on the transmission power indication. The operations of block 1720 may be performed according to the methods described with reference to FIGS.

2 through 4. In certain examples, the operations of block 1720 may be performed by an UL communications component as described with reference to FIGS. 9 through 11.

Figure 18:
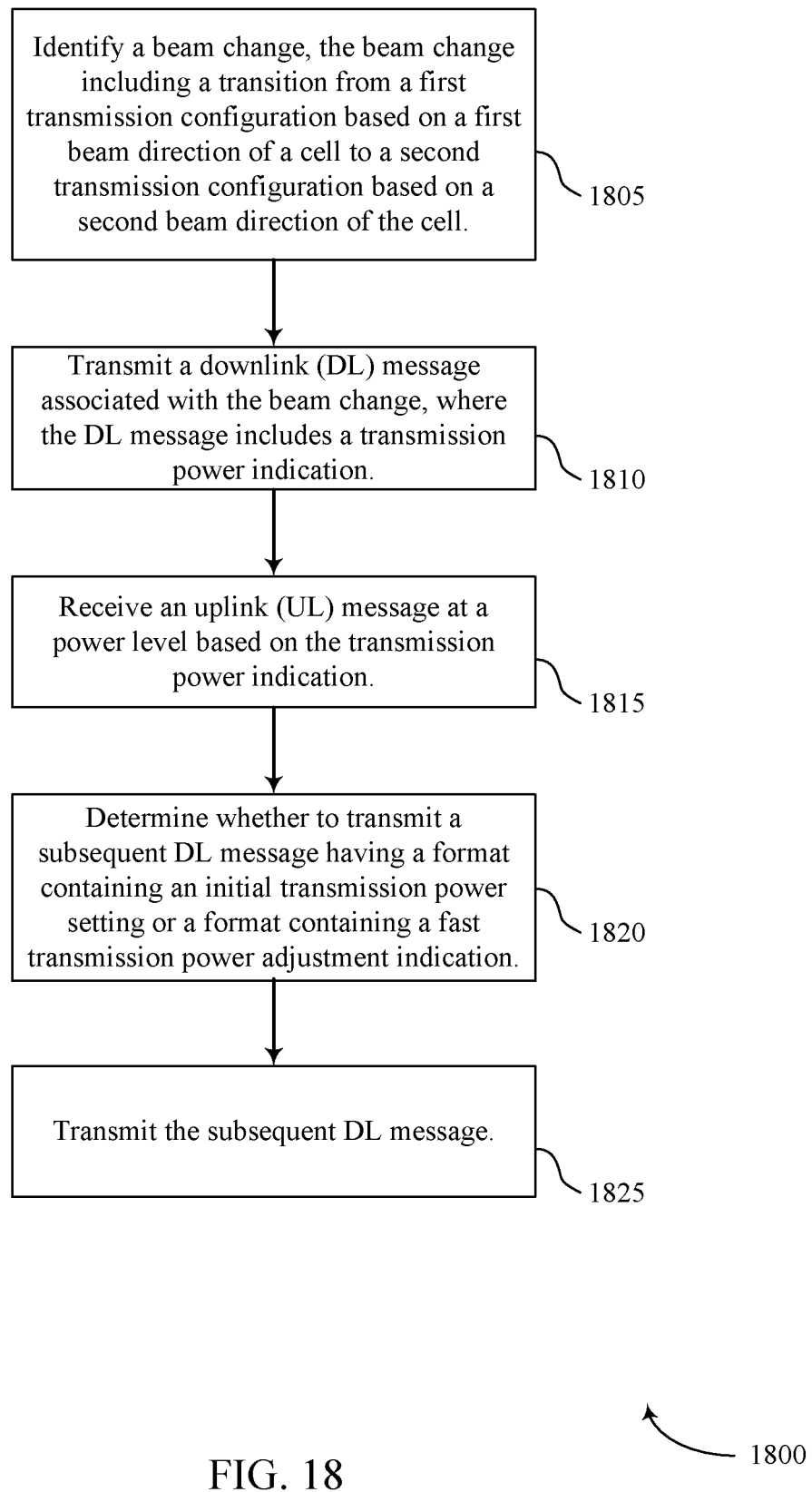

FIG. 18 shows a flowchart illustrating a method 1800 for uplink transmit power control after beam change in accordance with various aspects of the present disclosure. The operations of method 1800 may be implemented by a base station 105 or its components as described herein. For example, the operations of method 1800 may be performed by a base station UL power manager as described with reference to FIGS. 9 through 11. In some examples, a base station 105 may execute a set of codes to control the functional elements of the device to perform the functions described below. Additionally or alternatively, the base station 105 may perform aspects the functions described below using special-purpose hardware.

At block 1805, the base station 105 may identify a beam change, the beam change including a transition from a first transmission configuration based on a first beam direction of a cell to a second transmission configuration based on a second beam direction of the cell. The operations of block 1805 may be performed according to the methods described with reference to FIGS. 2 through 4. In certain examples, the operations of block 1805 may be performed by a beam change component as described with reference to FIGS. 9 through 11.

At block 1810, the base station 105 may transmit a DL message associated with the beam change, where the DL message includes a transmission power indication. The operations of block 1810 may be performed according to the methods described with reference to FIGS. 2 through 4. In certain examples, the operations of block 1810 may be performed by a DL communications component as described with reference to FIGS. 9 through 11.

At block 1815, the base station 105 may receive an UL message at a power level based on the transmission power indication. The operations of block 1815 may be performed according to the methods described with reference to FIGS. 2 through 4. In certain examples, the operations of block 1815 may be performed by an UL communications component as described with reference to FIGS. 9 through 11.

At block 1820, the base station 105 may determine whether to transmit a subsequent DL message having a format containing an initial transmission power setting or a format containing a fast transmission power adjustment indication. The operations of block 1820 may be performed according to the methods described with reference to FIGS. 2 through 4. In certain examples, the operations of block 1820 may be performed by an indication type component as described with reference to FIGS. 9 through 11.

At block 1825, the base station 105 may transmit the subsequent DL message. The operations of block 1825 may be performed according to the methods described with reference to FIGS. 2 through 4. In certain examples, the operations of block 1825 may be performed by a DL communications component as described with reference to FIGS. 9 through 11.

It should be noted that the methods described above describe possible examples, and that the operations and the steps may be rearranged or otherwise modified and that other examples are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a beam change based at least in part on a beam change condition, the beam change comprising a transition from a first transmission configuration based at least in part on a first beam direction of a cell to a second transmission configuration based at least in part on a second beam direction of the cell;
   transmitting, based at least in part on the beam change condition, a beam change request message;
   receiving a downlink (DL) message associated with the identifying the beam change and with the beam change request message, wherein the DL message comprises a transmission power indication and wherein the transmission power indication comprises a transmit power control (TPC) command; and
   transmitting an uplink (UL) message at a power level based at least in part on the receiving.

2. The method of claim 1, wherein
   transmitting the beam change request message comprises:
   transmitting the beam change request message using a random access channel (RACH) transmission configuration.

3. The method of claim 1, wherein
   transmitting the beam change request message comprises:
   transmitting the beam change request message using subcarrier regions of a RACH subframe other than subcarrier regions reserved for RACH transmissions.

4. The method of claim 1, wherein
   transmitting the beam change request message comprises:
   transmitting the beam change request message using a physical uplink control channel (PUCCH).

5. The method of claim 1, wherein
   transmitting the beam change request message comprises:
   transmitting the beam change request message via one of a RACH transmission configuration, a subcarrier region of a RACH subframe other than a subcarrier region reserved for RACH transmissions, or a PUCCH based at least in part on a channel condition, a timing alignment, or both.

6. The method of claim 1, wherein
   receiving the DL message comprises: receiving a beam change request response.

7. The method of claim 1, wherein
   receiving the DL message comprises: receiving the DL message using a physical downlink shared channel (PDSCH) or a physical downlink control channel (PDCCH).

8. The method of claim 1, wherein the DL message comprises a number of bits reserved for an initial transmission power setting.

9. The method of claim 8, wherein the bits reserved for the initial transmission power setting are associated with a downlink control information (DCI) format, and wherein the number of bits is based at least in part on the beam change.

10. The method of claim 8, wherein the number of bits is at least three.

11. The method of claim 1, wherein the DL message comprises a number of bits reserved for a transmission power adjustment indication.

12. The method of claim 11, wherein the bits reserved for the transmission power adjustment indication is associated with a DCI format, and wherein the number of bits is based at least in part on the beam change.

13. The method of claim 11, wherein the number of bits is at least three.

14. The method of claim 1, further comprising:
    receiving a subsequent DL message comprising a subsequent transmission power indication;
    determining whether the subsequent transmission power indication is associated with an initial transmission power setting or a transmission power adjustment indication; and
    adjusting a transmission power based at least in part on the determining.

15. The method of claim 14, wherein
    receiving the subsequent DL message comprises: receiving the subsequent DL message using a PDSCH or a PDCCH.

16. The method of claim 1, wherein the beam change is further based at least in part on at least one channel condition associated with the first beam direction.

17. A method for wireless communication, comprising:
    identifying a beam change, the beam change comprising a transition from a first transmission configuration based at least in part on a first beam direction of a cell to a second transmission configuration based at least in part on a second beam direction of the cell;
    receiving a beam change request message associated with the beam change;
    transmitting a downlink (DL) message associated with the identifying the beam change and with the beam change request message, wherein the DL message comprises a transmission power indication and wherein the transmission power indication comprises a transmit power control (TPC) command; and
    receiving an uplink (UL) message at a power level based at least in part on the receiving.

18. The method of claim 17, wherein
    receiving the beam change request message comprises:
    receiving the beam change request message using subcarrier regions of a RACH subframe other than subcarrier regions reserved for RACH transmissions.

19. The method of claim 17, wherein
    receiving the beam change request message comprises:
    receiving the beam change request message via one of a RACH transmission configuration, a subcarrier region of a RACH subframe other than a subcarrier region reserved for RACH transmissions, or a PUCCH based at least in part on a channel condition, a timing alignment, or both.

20. The method of claim 17, wherein transmitting the DL message comprises: transmitting a beam change request response.

21. The method of claim 17, wherein the beam change is based at least in part on downlink scheduling factors.

22. The method of claim 17, wherein the beam change is further based at least in part on at least one channel condition associated with the first beam direction.

23. The method of claim 17, wherein identifying the beam change further comprises performing a beam scan to identify the second beam direction of the cell.

24. The method of claim 17, wherein the beam change is based at least in part on accommodating communications associated with more than one user equipment (UE).

25. An apparatus for wireless communication, in a system comprising:
   a processor;
   memory in electronic communication with the processor; and
   instructions stored in the memory and operable, when executed by the processor, to cause the apparatus to:
   identify a beam change based at least in part on a beam change condition, the beam change comprising a transition from a first transmission configuration based at least in part on a first beam direction of a cell to a second transmission configuration based at least in part on a second beam direction of the cell;
   transmitting, based at least in part on the beam change condition, a beam change request message;
   receive a downlink (DL) message associated with the identifying the beam change and with the beam change request message, wherein the DL message comprises a transmission power indication and wherein the transmission power indication comprises a transmit power control (TPC) command; and
   transmit an uplink (UL) message at a power level based at least in part on the receiving.

26. An apparatus for wireless communication, in a system comprising:
   a processor;
   memory in electronic communication with the processor; and
   instructions stored in the memory and operable, when executed by the processor, to cause the apparatus to:
   identify a beam change, the beam change comprising a transition from a first transmission configuration based at least in part on a first beam direction of a cell to a second transmission configuration based at least in part on a second beam direction of the cell;
   receive a beam change request message associated with the beam change;
   transmit a downlink (DL) message associated with the identifying the beam change and with the beam change request message, wherein the DL message comprises a transmission power indication and wherein the transmission power indication comprises a transmit power control (TPC) command; and
   receive an uplink (UL) message at a power level based at least in part on the receiving.

* * * * *

UNITED STATES PATENT AND TRADEMARK OFFICE
CERTIFICATE OF CORRECTION

PATENT NO. : 10,341,959 B2
APPLICATION NO. : 15/355647
DATED : July 2, 2019
INVENTOR(S) : Islam et al.

It is certified that error appears in the above-identified patent and that said Letters Patent is hereby corrected as shown below:

In the Claims

Claim 17, Column 28, Line 57 should read:
"at least in part on the transmitting"

Claim 25, Column 29, Line 31 should read:
"transmit, based at least in part on the beam change"

Claim 25, Column 30, Line 8 should read:
"at least in part on receipt of the DL message"

Claim 26, Column 30, Line 31 should read:
"least in part on transmission of the DL message"

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*